United States Patent
Chen et al.

(10) Patent No.: US 10,740,360 B2
(45) Date of Patent: Aug. 11, 2020

(54) TRANSACTION DISCOVERY IN A LOG SEQUENCE

(71) Applicant: International Business Machines Corporation, Armonk, NY (US)

(72) Inventors: Pengfei Chen, Beijing (CN); Fan Jing Meng, Beijing (CN); Jing Min Xu, Beijing (CN); Lin Yang, Beijing (CN); Xiao Zhang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 15/357,649

(22) Filed: Nov. 21, 2016

(65) Prior Publication Data
US 2018/0144041 A1 May 24, 2018

(51) Int. Cl.
| | |
|---|---|
| G06F 17/30 | (2006.01) |
| G06F 16/28 | (2019.01) |
| G06F 9/46 | (2006.01) |
| G06F 16/2455 | (2019.01) |
| H04L 29/08 | (2006.01) |

(52) U.S. Cl.
CPC .......... *G06F 16/285* (2019.01); *G06F 9/466* (2013.01); *G06F 16/24568* (2019.01); *H04L 67/10* (2013.01)

(58) Field of Classification Search
CPC ............... G06F 17/30598; G06F 9/466; G06F 17/30516; G06F 16/285; G06F 16/24568; H04L 67/10

USPC ....... 707/776, 703, 692, 737, 748, 750, 613, 707/620, 634, 691
See application file for complete search history.

(56) References Cited

U.S. PATENT DOCUMENTS

| | | | | |
|---|---|---|---|---|
| 6,502,133 | B1 * | 12/2002 | Baulier | G06F 9/542 709/224 |
| 7,836,054 | B2 * | 11/2010 | Kawai | G06Q 10/107 707/737 |
| 8,321,667 | B2 * | 11/2012 | Bradshaw | G06F 21/6218 707/703 |
| 9,122,694 | B1 | 9/2015 | Dukes et al. | |
| 9,244,755 | B2 | 1/2016 | Huang et al. | |
| 9,262,519 | B1 * | 2/2016 | Saurabh | G06F 16/285 |

(Continued)

OTHER PUBLICATIONS

Sumologic.com, "Anomaly Detection: The Machine Data Analytics Challenge," https://www.sumologic.com/resource/datasheet/anomaly-detection/. Last Accessed: Oct. 6, 2016, 5 pages.

(Continued)

*Primary Examiner* — Shiow-Jy Fan
(74) *Attorney, Agent, or Firm* — Amin, Turocy & Watson, LLP

(57) ABSTRACT

Techniques that facilitate identification and/or analysis of sequences associated with computing devices are provided. In one example, a system includes a transaction component, a clustering component and a model component. The transaction component identifies at least one sequence in a stream of sequences generated by a computing device in communication with the system. The clustering component assigns the at least one sequence to a transaction sequence group. The model component generates a transaction model based on the transaction sequence group.

20 Claims, 17 Drawing Sheets

(56) References Cited

U.S. PATENT DOCUMENTS

| | | | | |
|---|---|---|---|---|
| 9,799,017 B1* | 10/2017 | Vermeulen | ............ | G06F 16/285 |
| 2006/0190493 A1* | 8/2006 | Kawai | ................ | G06Q 10/107 |
| 2009/0113246 A1* | 4/2009 | Sabato | ................ | G06F 11/0769 |
| | | | | 714/37 |
| 2011/0185234 A1* | 7/2011 | Cohen | ................ | G06F 11/3476 |
| | | | | 714/37 |
| 2011/0296244 A1* | 12/2011 | Fu | ....................... | G06F 11/3608 |
| | | | | 714/37 |
| 2012/0124047 A1* | 5/2012 | Hubbard | ........... | G06F 17/30637 |
| | | | | 707/737 |
| 2012/0246303 A1* | 9/2012 | Petersen | ........... | G06F 17/30144 |
| | | | | 709/224 |
| 2012/0284221 A1* | 11/2012 | Shelton | ............... | H04L 41/0604 |
| | | | | 706/47 |
| 2014/0164376 A1* | 6/2014 | Yang | ................... | G06F 17/3071 |
| | | | | 707/737 |
| 2014/0324865 A1 | 10/2014 | Mizutani | | |
| 2014/0344622 A1* | 11/2014 | Huang | .................. | G06F 11/079 |
| | | | | 714/37 |
| 2015/0220605 A1 | 8/2015 | Syed et al. | | |
| 2015/0293920 A1 | 10/2015 | Kanjirathinkal et al. | | |
| 2015/0378775 A1 | 12/2015 | Vermeulen | | |
| 2016/0070589 A1* | 3/2016 | Vermeulen | .............. | G06F 9/466 |
| | | | | 711/153 |
| 2016/0092552 A1* | 3/2016 | Morfonios | ........ | G06F 17/30091 |
| | | | | 707/737 |
| 2017/0024912 A1* | 1/2017 | de Castro Alves | ... | G06T 11/206 |
| 2017/0185576 A1* | 6/2017 | Agarwal | ................. | G06F 16/24 |

OTHER PUBLICATIONS

Splunk.com, "anomalydetection," https://docs.splunk.com/Documentation/Splunk/6.4.1/SearchReference/Anomalydetection. Last Accessed: Oct. 6, 2016, 5 pages.

Yu, et al. "CloudSeer: Workflow Monitoring of Cloud Infrastructures via Interleaved Logs". ACM, 2016, 14 pages.

Marketsandmarkets.com, "IT Operations Analytics Market worth 19.84 Billion USD by 2022," http://www.marketsandmarkets.com/PressReleases/it-operations-analytics.asp, Retrieved: May 2, 2019, 2 pages.

* cited by examiner

TRANSACTION DISCOVERY IN A LOG SEQUENCE

BACKGROUND

The present invention relates to log sequences associated with computing devices, and more specifically, to identifying and/or analyzing log sequences associated with computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. One or more embodiments herein describe systems, computer-implemented methods, and/or computer program product in accordance with the present invention.

According to an embodiment, a system includes a transaction component, a clustering component, and a model component. The transaction component can identify at least one sequence in a stream of sequences generated by a computing device in communication with the system. The clustering component can assign the at least one transaction sequences to a transaction sequence group. The model component can generate a transaction model based on the transaction sequence group.

Other embodiments include a computer-implemented method and a computer program product.

DETAILED DESCRIPTION

Figure 1:
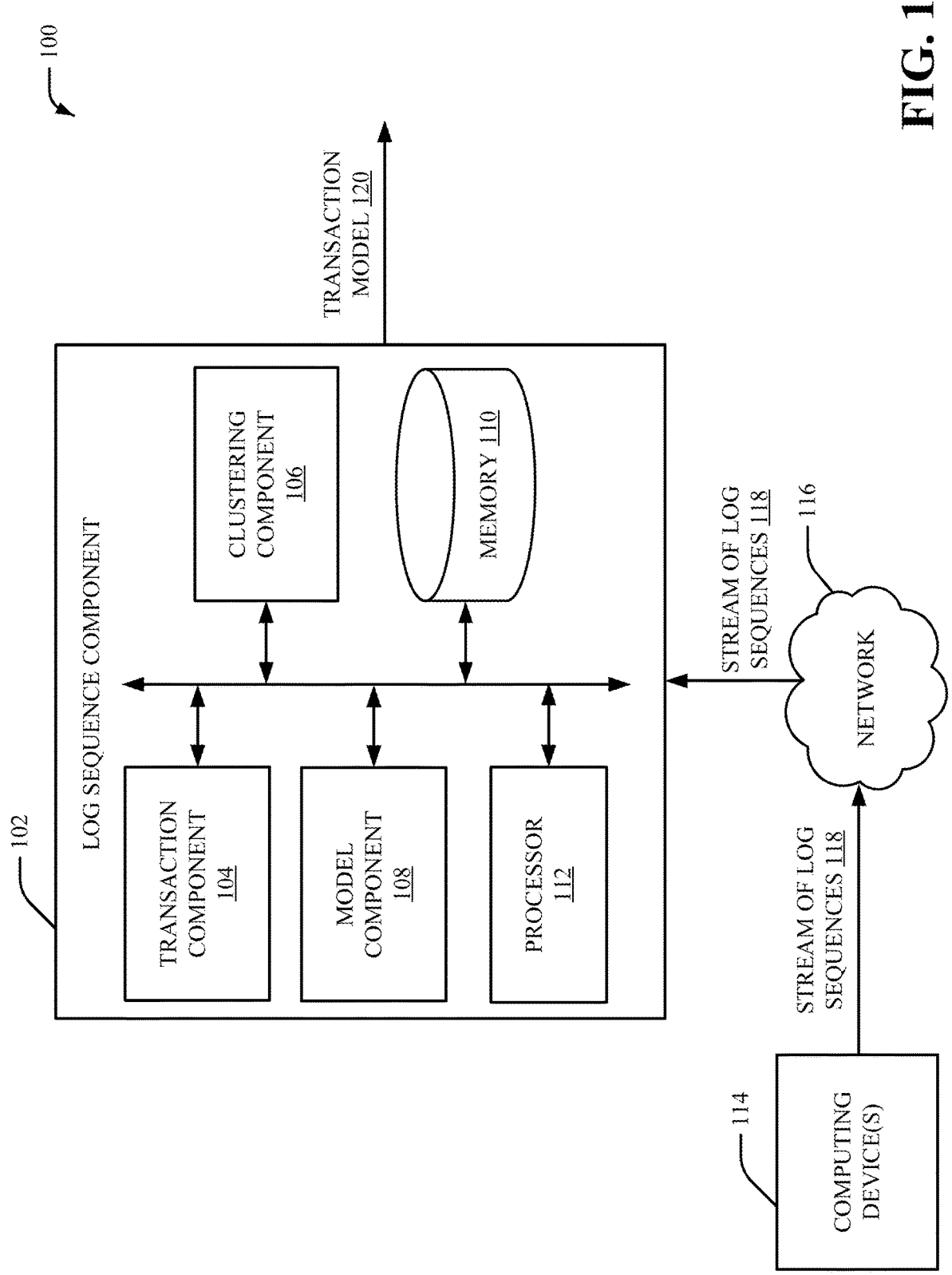
FIG. 1 illustrates a block diagram of an example, non-limiting system to facilitate identifying and/or analyzing log sequences in accordance with one or more embodiments of the present invention.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Cloud platform systems are becoming increasingly complex. Generally, fulfillment of an operation executed by a cloud platform system is performed based on a collaboration between numerous computing devices (e.g., loosely coupled computing devices). Misbehavior of any single computing device can cause failure of the operation and/or can result in the cloud platform system becoming inoperable. As a result, monitoring tools can be employed to monitor a cloud platform system that includes numerous computing devices. For instance, a log analytics system can be employed to collect and/or analyze computer-generated data (e.g., logs) generated by computing devices. Furthermore, metrics associated with the computer-generated data can be determined by a log analytics system. In one example, a log analytics system can determine how frequent a particular type of computer-generated data is generated by computing devices. However, the computer-generated data is generally analyzed by the log analytics system as unprocessed and/or unstructured computer-generated data. As such, analyzing the computer-generated data is generally computationally expensive, time consuming and/or difficult to perform.

Embodiments described herein include systems, computer-implemented methods, and computer program products that facilitate identification and/or analysis of log sequences associated with computing devices.

FIG. 1 illustrates a block diagram of an example, non-limiting system that facilitates identification and/or analysis of log sequences associated with computing devices in accordance with one or more embodiments. In various embodiments, the system 100 can be associated with, or included in a cloud platform system. A few other exemplary (non-limiting) systems that system 100 can be associated with, or included in are: a log analytics system (e.g., a real-time log analytics system), a log management system, a monitoring system, an operational intelligence system, a computing device system, an application management system, a server system, a network system, a web system, an on-premise system, a machine learning system, an artificial intelligence system, and other types of systems. The system 100 can employ hardware and/or software to solve problems that are highly technical in nature, that are not abstract and that cannot be performed as a set of mental acts by a human. Further, some of the processes performed can be performed by a specialized computer (e.g., a specialized computer with a log sequence component) for carrying out defined tasks related to memory operations. The system 100 and/or components of the system can be employed to solve new problems that arise through advancements in technology, employment of computing devices, employment of a cloud platform, generation of log sequences and/or computer architecture, and the like. One or more embodiments of the system 100 can also provide technical improvements to a computing device by improving detection of anomalies with respect to the computing device, decreasing anomalies with respect to the computing device, improving performance of the computing device, and/or improving efficiency of the computing device.

In the embodiment shown in FIG. 1, the system 100 can include a log sequence component 102. As shown in FIG. 1, the log sequence component 102 can include a transaction component 104, a clustering component 106 and a model component 108. Aspects of the log sequence component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the log sequence component 102 can also include memory 110 that stores computer executable components and instructions. Furthermore, the log sequence component 102 can include a processor 112 to facilitate execution of the instructions (e.g., computer executable components and corresponding instructions) by the log sequence component 102. As shown, the transaction component 104, the clustering component 106, the model component 108, the memory 110 and/or the processor 112 can be electrically and/or communicatively coupled to one another in one or more embodiments.

The log sequence component 102 can be in communication with one or more computing devices 114 via a network 116. A computing device from the one or more computing devices 114 can be a hardware device that includes one or more processors. For instance, a computing device from the one or more computing devices 114 can include an electronic device, a network device, a cloud device (e.g. a cloud component) and/or another type of device that generates a sequence of logs (e.g., computer-generated data) using one or more processors. The network 116 can include one or more networks. For example, the network 116 can include one or more wireless networks and/or one or more wired networks, including but not limited to, a wide area network (WAN, e.g., the Internet), a local area network (LAN) and/or a cellular network. The network 116 can also include one or more network devices (e.g., network hardware, network equipment, computer networking devices, etc.) to facilitate communication and/or interaction between at least the one or more computing devices 114 and the log sequence component 102. In an embodiment, the one or more computing devices 114 can be one or more cloud components that are distributed among one or more locations (e.g., one or more remote locations).

The one or more computing devices 114 can generate a stream of log sequences 118. The stream of log sequences 118 can be computer-generated data generated in response to execution of an operation by the one or more computing devices 114. The stream of log sequences 118 can, for example, be generated by the one or more computing devices 114 in real-time. Furthermore, the stream of log sequences 118 can include information regarding one or more operations of the one or more computing devices 114. For instance, the stream of log sequences 118 can include computer-generated data (e.g., machine data) that is generated in response to one or more operations executed by the one or more computing devices 114. In one example, at least a portion of the stream of log sequences 118 can be generated by a program (e.g., software, an application, etc.) executed by the one or more computing devices 114. In certain embodiments, the stream of log sequences 118 can be a stream of raw log sequences (e.g., a stream of unprocessed log sequences).

The log sequence component 102 can receive the stream of log sequences 118 via the network 116. For instance, log sequences from the stream of log sequences 118 can be repeatedly received by the log sequence component 102 as the log sequences are generated by the computing device 114. The transaction component 104 can identify one or more transaction sequences in the stream of log sequences 118. The transaction component 104 can identify one or more transaction sequences in the stream of log sequences 118 based on a set of digital signatures generated for one or more portions of the stream of log sequences 118 and/or a set of filtering techniques. A digital signature can be a digital pattern for at least a portion of a log sequence. For example, a digital signature can be a potential border between a first transaction sequence and a second transaction sequence included in the stream of log sequences 118. A transaction sequence can represent an operation performed with respect to the one or more computing devices 114. As such, the transaction component 104 can identify one or more operations included in the stream of log sequences 118. A digital signature can include a set of digital data that corresponds to at least a portion of a log sequence. In an aspect, a digital signature can be a digital fingerprint that comprises digital fingerprint data (e.g., a string of bits) associated with a portion of the stored data. Furthermore, a digital signature can uniquely identify and/or convey a portion of the stream of log sequences 118. In an aspect, a digital signature can be a data element that encodes a portion of the stream of log sequences 118. The set of digital signatures can be generated by the transaction component 104. Additionally or alternatively, the set of digital signatures can be stored in a memory or a database. For instance, the set of digital signatures can be stored in the memory 110 or another memory in communication with the log sequence component 102 (not shown) to facilitate further analysis of the set of digital signatures and/or the stream of log sequences 118.

In an embodiment, the transaction component 104 can employ one or more data mining techniques to generate the set of digital signatures. For example, the transaction component 104 can identify digital patterns in the stream of log sequences 118 and correlate the digital patterns to digital signatures. The one or more data mining techniques employed by the transaction component 104 can include machine learning and/or artificial intelligence techniques for identifying digital patterns. The transaction component 104 can employ one or more machine learning techniques and/or one or more artificial intelligence techniques to facilitate identification of digital patterns in the stream of log sequences 118. In an aspect, the transaction component 104 can extract information indicative of correlations, inferences and/or expressions from the stream of log sequences 118 based on principles of artificial intelligence. In another aspect, the transaction component 104 can perform learning with respect to the stream of log sequences 118 and/or digital patterns. The learning can be performed explicitly or implicitly. The transaction component 104 can also employ an automatic classification system and/or an automatic classification process to facilitate identification of digital patterns in the stream of log sequences 118. For example, the transaction component 104 can employ a probabilistic and/or statistical-based analysis (e.g., factoring into the analysis utilities and costs) to learn and/or generate inferences with respect to digital patterns in the stream of log sequences 118. The transaction component 104 can employ, for example, a support vector machine (SVM) classifier to learn and/or generate inferences with respect to the digital patterns in the stream of log sequences 118. Additionally or alternatively, the transaction component 104 can employ other classification techniques associated with Bayesian networks, decision trees and/or probabilistic classification models. Classifiers employed by the transaction component 104 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class— that is, f(x)=confidence(class).

In an aspect, the transaction component 104 can employ inference based schemes to facilitate learning and/or generating inferences for identifying digital patterns in the stream of log sequences 118. The transaction component 104 can employ any suitable machine-learning based techniques, statistical-based techniques and/or probabilistic-based techniques. For example, the transaction component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. The techniques can include a set of machine learning computations associated with analysis of the stream of log sequences 118. For example, the transaction component 104 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations with respect to the stream of log sequences 118.

In another embodiment, the transaction component 104 can generate a graph of the set of digital signatures (e.g., a log sequence graph, a digital signature graph, etc.) determined by the transaction component 104. The graph can represent transitions with respect to the digital patterns (e.g., the set of digital signatures) identified in the stream of log sequences 118. Furthermore, the graph can be structured based on characteristics of the set of digital signatures. The characteristics can include characteristics local to a digital signatures (e.g., local support characteristics). For example, the transaction component 104 can determine a percentage of digital signatures that end with a particular digital pattern (e.g., a percentage of digital signatures that end with "453", etc.). Additionally or alternatively, the characteristics can include characteristics that are global with respect to the set of digital signatures (e.g., global support characteristics). For example, the transaction component 104 can determine a percentage of digital signatures with a particular digital pattern that transition to another digital signature with another particular digital pattern (e.g., a percentage of digital signatures ending with "453" that transition to a digital signature ending with "341", etc.).

In yet another embodiment, the transaction component 104 can filter the set of digital signatures based on the characteristics of the set of digital signatures. For example, the transaction component 104 can filter the set of digital signatures based on the local support characteristics and/or the global support characteristics. The transaction component 104 can remove one or more digital signatures from the set of digital signatures in response to a determination that a local support characteristic for the one or more digital signatures satisfies a defined criterion. For instance, the transaction component 104 can remove one or more digital signatures from the set of digital signatures in response to a determination that a percentage value associated with a local support characteristic for the one or more digital signatures is above a threshold percentage value. In a non-limiting example, the transaction component 104 can remove a particular digital signature from the set of digital signatures in response to a determination that a local support characteristic is greater than 20%. Additionally or alternatively, the transaction component 104 can remove one or more digital signatures from the set of digital signatures in response to a determination that a global support characteristic for the one or more digital signatures satisfies a defined criterion. For instance, the transaction component 104 can remove one or more digital signatures from the set of digital signatures in response to a determination that a percentage value associated with a global support characteristic for the one or more digital signatures is above a threshold percentage value. In a non-limiting example, the transaction component 104 can remove a particular digital signature from the set of digital signatures in response to a determination that a global support characteristic is greater than 1%.

The transaction component 104 can identify one or more transaction sequences in the stream of log sequences 118 based on timing information associated with the one or more transaction sequences. For example, the transaction component 104 can analyze the set of digital signatures and/or candidate transactions based on timing information. In certain embodiments, the transaction component 104 can analyze a pair of candidate transactions associated with a digital signature from the set of digital signatures. In an aspect, the transaction component 104 can analyze a pair of candidate transactions based on timing information associated with the pair of candidate transactions. For instance, the transaction component 104 can determine how long a transition period is between the pair of candidate transactions. In another aspect, the transaction component 104 can identify one or more transaction sequences in the stream of log sequences 118 based on a quality metric associated with the one or more transaction sequences. For example, the transaction component 104 can analyze candidate transactions based on quality information. In one example, the transaction component 104 can determine whether coverage information for the candidate transactions satisfies a defined criterion. The coverage information can represent a degree to which a candidate transaction is contained within borders identified by the transaction component 104. In another example, the transaction component 104 can determine whether length information for the candidate transactions satisfies a defined criterion. The length information can represent a length of a candidate transaction (e.g., a length of a sequence of digital data associated with the pair of candidate transactions). In yet another example, the transaction component 104 can determine whether count information for the candidate transactions satisfies a defined criterion. The count information can represent a total number transaction instances in the stream of log sequences 118. The transaction component 104 can also, for example, determine whether interval information for the candidate transactions satisfies a defined criterion. The interval information can represent an average scheduling time between two consecutive transactions. In another example, the transaction component 104 can determine whether confidence information for the candidate transactions satisfies a defined criterion. The confidence information can represent a significance level of Anderson-Darling test that tests whether a candidate transaction is associated with an inter-transaction transition where execution of the candidate transaction results in execution of another candidate transaction. In yet another example, the transaction component 104 can determine whether sample sequence information for the candidate transactions satisfies a defined criterion. The sample sequence information can represent a sample of a transaction (e.g., a previously determined transaction). In response to a determination that the timing information and/or the quality information satisfies a defined criterion, the transaction component 104 can identify a set of transaction sequences in the stream of log sequences 118. For instance, the transaction component 104 can identify at least a first transaction sequence and a second transaction sequence in the stream of log sequences 118 based on a digital signature associated with a portion of the stream of log sequences 118 and/or one or more filtering criteria associated with the stream of log sequences 118.

The clustering component 106 can assign transaction sequences from the set of transaction sequences identified by the transaction component 104 to groups of transaction sequences based on characteristics of the transaction sequences. The characteristics can include, for example, a length associated with a transaction sequence (e.g., number of log entries included in a transaction sequence), an interval of time associated with an execution of a transaction sequence via the one or more computing devices 114, a total number of times a transaction sequence occurs in the stream of log sequences 118, a total number of digital signatures associated with a transaction sequence and/or other characteristics associated with a transaction sequence. For example, the clustering component can assign a first transaction sequence to a first group of transaction sequences (e.g., a first transaction sequence group) based on a length of the first transaction, an interval of time associated with an execution of the first transaction sequence by the one or more computing devices 114, a total number of time the first transaction occurs in the sequence of log streams, and/or a total number of digital signatures associated with the first transaction sequence. In a non-limiting example, the clustering component 106 can assign a first transaction sequence to a first group of transaction sequences based on a first criterion associated with a first characteristic of the first transaction sequence. Additionally or alternatively, the clustering component 106 can assign a second transaction sequence to a second group of transaction sequences (e.g., a second transaction sequence group) based on a second criterion associated with a second characteristic of the second transaction sequence. Additionally or alternatively, the clustering component 106 can assign a third transaction sequence to the first group of transaction sequences based on the first criterion associated with a third characteristic of the third transaction sequence. As such, a group of transaction sequences (e.g., a transaction sequence group) can represent transaction sequences with similar characteristics. In one example, a group of transaction sequences can represent transaction sequences with a corresponding type of transaction sequence.

The model component 108 can generate a transaction model 120 based on the groups of transaction sequences. The transaction model 120 can include one or more transaction models. Furthermore, the transaction model 120 can include transaction sequences from the groups of transaction sequences and/or statistics associated with transaction sequences from the groups of transaction sequences. Additionally or alternatively, the model component 108 can compare the groups of transaction sequences to a set of defined models for the one or more computing devices 114. For example, the model component 108 can compare a first group of transaction sequences to a first model associated with the one or more computing devices 114, the model component 108 can compare a second group of transaction sequences to a second model associated with the one or more computing devices 114, etc. In an embodiment, the log sequence component 102 (e.g., the model component 108) can provide software as a service in a cloud environment associated with the transaction model 120.

It is to be appreciated that the log sequence component 102 (e.g., via the transaction component 104, the clustering component 106 and/or the model component 108) can process and/or analyze a stream of log sequences and/or transaction sequences. For example, an amount of data processed, a speed of processing of data and/or data types processed by the log sequence component 102 (e.g., the transaction component 104, the clustering component 106 and/or the model component 108) over a certain period of time with respect to processing and/or analyzing a stream of log sequences and/or transaction sequences can be greater, faster and different than an amount, speed and data type that can be mentally processed by a human mind over the same period of time. The log sequence component 102 (e.g., the transaction component 104, the clustering component 106 and/or the model component 108) can also be fully operational towards performing one or more other functions (e.g., fully powered on, fully executed, etc.) while also performing the above-referenced processing and/or analyzing.

In an embodiment, the stream of log sequence 118 can represent a transaction executed by the one or more computing device 114 associated with an execution environment. The stream of log sequences 118 can be identified and/or analyzed by the log sequence component 102 without predetermined information (e.g., pre-knowledge) regarding the one or more computing devices 114, the execution environment and/or an application executed by the one or more computing devices 114. The stream of log sequences 118 can also be auto-discovered by the transaction component 104 via one or more data mining processes. Furthermore, the transaction component 104 can correlate log sequences of the stream of log sequences 118 from different computing devices 114. In an aspect, processing and/or analysis with respect to a cloud platform system can be performed by the log sequence component 102 based on the stream of log sequences 118. In an embodiment, the log sequence component 102 can divide the stream of log sequences 118 into streams of log sequences generated by different processing threads. The stream of log sequences 118 can represent execution of different types of transactions by the one or more computing devices 114. Additionally, the transaction component 114 can be a transaction border splitter that can identify one or more borders between transactions in the streams of log sequences 114. The transaction component 114 can identify the one or more borders based on one or more data mining processes associated with a set of log signatures, analysis of the log signatures, filtering of the log signatures and/or quality metrics associated with the log signatures. The one or more borders can be employed to divide the streams of log sequences 114 into various transaction sequences. The clustering component 106 can perform transaction sequence clustering. The transaction sequence clustering can be further employed to cluster the various transaction sequences into groups representing different transaction types.

In another aspect, the model component 108 can model the stream of log sequences 118 via one or more machine learning algorithms. The model component 108 can also score the stream of log sequences 118 in real-time as the stream of log sequences 118 are generated by one or more computing devices 114. For instance, the stream of log sequences 118 and/or statistics related to the stream of log sequences 118 can be summarized as a reference model via the model component 108. The stream of log sequences 118 and/or the transaction model 120 generated by the model component 108 can facilitate detection of an anomaly associated with a cloud platform system and/or the one or more computing devices 114. Additionally, the stream of log sequences 118 and/or the transaction model 120 can facilitate determining performance, functionality and/or quality metrics associated with a cloud platform system and/or the one or more computing devices 114. A high-level view of stream of log sequences 118, a cloud platform system and/or the one or more computing devices 114 can also be provided via the log sequence component 102. As such, anomalies associated with the one or more computing devices 114 and/or a cloud platform system can be reduced, performance of the one or more computing devices 114 and/or a cloud platform system can be improved, and/or processing efficiency of the one or more computing devices 114 and/or a cloud platform system can be improved.

Figure 2:
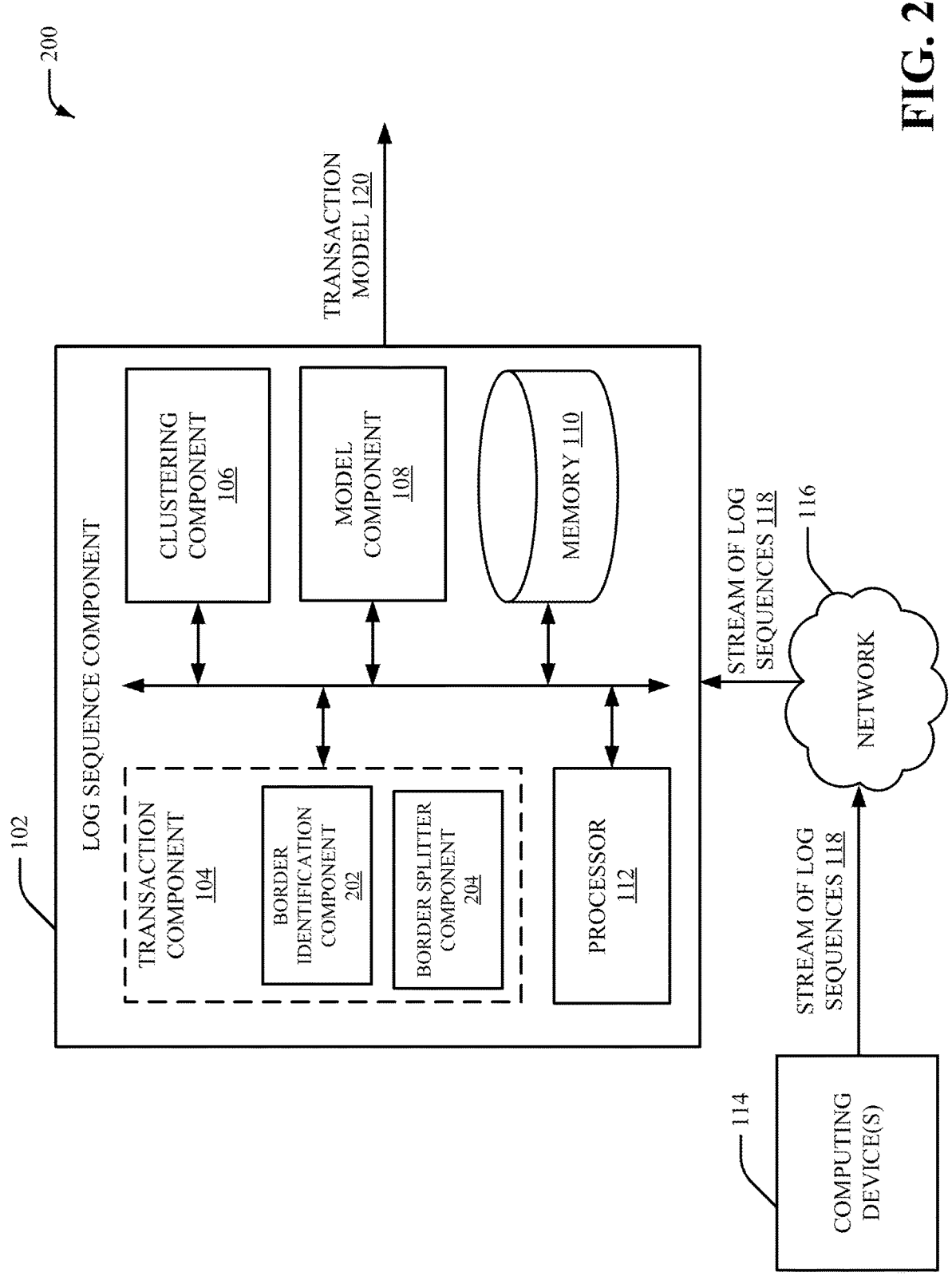
FIG. 2 illustrates a block diagram of another example, non-limiting system in accordance with one or more embodiments of the present invention.

FIG. 2 illustrates a block diagram of an example, non-limiting system 200 in accordance with one or more embodiments. Repetitive description of like elements employed in other embodiments described herein is omitted for sake of brevity.

Referring now to FIG. 2, system 200 includes log sequence component 102. The log sequence component 102 can further include transaction component 104, clustering component 106, model component 108, memory 110 and processor 112.

The transaction component 104 can include a border identification component 202 and a border splitter component 204. The border identification component 202 can identify a set of candidate borders included in the stream of log sequences 118. For example, the border identification component 202 can identify a border between neighboring transactions in the stream of log sequences 118. To identify the set of candidate borders in the stream of log sequences 118, the border identification component 202 can perform a data mining procedure with respect to the stream of log sequences 118. For instance, the border identification component 202 can identify and/or analyze digital patterns in digital data associated with the stream of log sequences 118. The data mining procedure performed by the border identification component 202 can include, for example, detecting repeating sequences in the stream of log sequences 118, detecting sequential patterns in the stream of log sequences 118, detecting changes in the stream of log sequences 118, determining relationships between digital data in the stream of log sequences 118, performing rule learning among digital data in the stream of log sequences 118, clustering digital data in the stream of log sequences 118, classifying digital data in the stream of log sequences 118, creating digital signatures of digital data in the stream of log sequences 118, etc. The data mining procedure performed by the border identification component 202 can also employ one or more machine learning techniques and/or one or more artificial intelligence techniques to facilitate identification and/or analysis of digital patterns in digital data associated with the stream of log sequences 118. In an aspect, the data mining procedure performed by the border identification component 202 can extract, using one or more machine learning techniques and/or one or more artificial intelligence techniques, information indicative of correlations, inferences and/or expressions from digital data associated with the stream of log sequences 118. In another aspect, the data mining procedure performed by the border identification component 202 can also perform learning with respect to digital data associated with the stream of log sequences 118. The border identification component 202 can also validate and/or filter the set of candidate borders. For instance, the border identification component 202 can filter the set of candidate borders based on the characteristics of the set of candidate borders. The border identification component 202 can filter the set of candidate borders based on characteristics local to individual candidate borders. Additionally or alternatively, the border identification component 202 can filter the set of candidate borders based on characteristics that are global with respect to the set of candidate borders by comparing candidate borders in the set of candidate borders.

The border splitter component 204 can employ the set of candidate borders determined by the border identification component 202 to divide the stream of log sequences 118 into a set of transaction sequences. For example, the set of candidate borders can be employed as a location for dividing the stream of log sequences 118. In an aspect, a transaction sequence in the stream of log sequences 118 can be considered a sequence of digital data between a first candidate border and a second candidate border from the set of candidate borders determined by the border identification component 202. The border splitter component 204 can also analyze and/or filter the set of transaction sequences. In an aspect, the border splitter component 204 can filter the set of transaction sequences based on timing information associated with the set of transaction sequences. For instance, the transaction component 104 can determine how long transition period are between transaction sequences in the set of transaction sequences. In one example, the border splitter component 204 can remove a transaction sequence from the set of transaction sequences in response to a determination that a transition period with respect to another transaction sequence is above a defined threshold level. In another aspect, the border splitter component 204 can filter the set of transaction sequences based on quality information associated with the set of transaction sequences. The quality information can include, for example, coverage information indicative of a degree to which a transaction sequence is contained within borders identified by the border identification component 202, length information indicative of a length of a transaction sequence, count information indicative of a total number transaction sequences in the set of transaction sequences, interval information indicative of an average scheduling time consecutive transaction sequences in the set of transaction sequences, confidence information indicative of a determination as to whether a transaction sequence is associated with an inter-transaction transition where execution of the transaction sequence results in execution of another transaction sequence, sample sequence information indicative of a sample of a transaction sequence (e.g., a previously determined transaction sequence), and/or other quality information associated with the set of transaction sequences. In one example, the border splitter component 204 can remove a particular transaction sequence from the set of transaction sequences in response to a determination that quality information associated with the particular transaction sequence satisfies a defined criterion (e.g., a quality value for the particular transaction sequence is below a defined threshold level).

Figure 3:
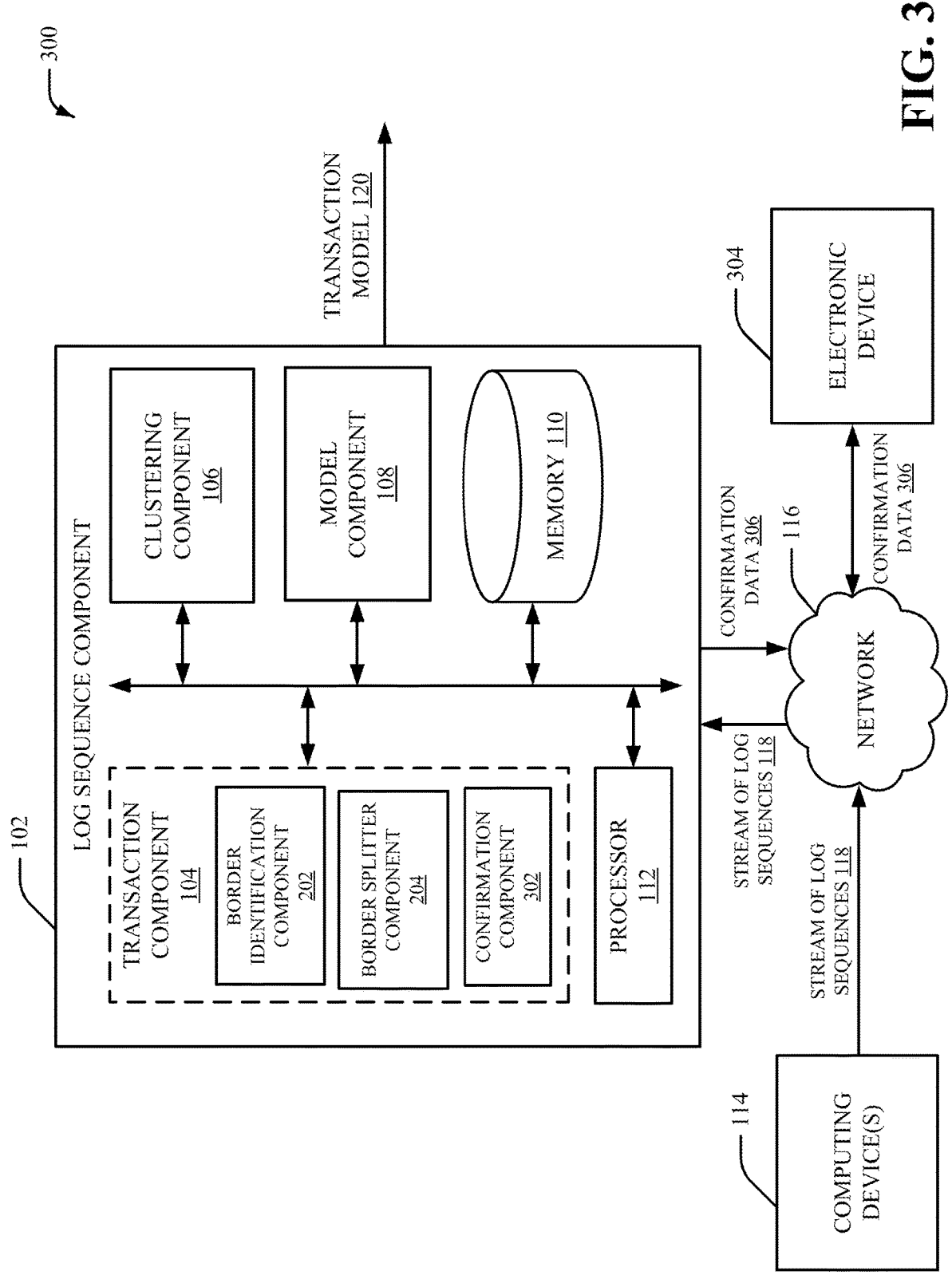
FIG. 3 illustrates a block diagram of yet another example, non-limiting system in accordance with one or more embodiments of the present invention.

FIG. 3 illustrates a block diagram of an example, non-limiting system 300 in accordance with one or more embodiments. Repetitive description of like elements employed in other embodiments described herein is omitted for sake of brevity.

Referring now to FIG. 3, system 300 includes log sequence component 102. The log sequence component 102 can include transaction component 104, clustering component 106, model component 108, memory 110 and processor 112.

The transaction component 104 can include the border identification component 202, the border splitter component 204 and/or a confirmation component 302. The confirmation component 302 can present the set of candidate borders (e.g., the set of candidate borders determined by the border identification component 202) on an electronic device 304. Additionally or alternatively, confirmation component 302 can present the quality information and/or the timing information (e.g., the quality information and/or the timing information determined by the border splitter component 204) on the electronic device 304. The electronic device 304 can be communicatively coupled to the log sequence component 102. The electronic device 304 can be implemented separate from the log sequence component 102. Alternatively, the electronic device 304 and/or a device associated with the electronic device 304 can include the log sequence component 102. The electronic device 304 can be associated with a display, a monitor and/or a user interface. Furthermore, the electronic device 304 can be a user device such as, but not limited to, a computer, a desktop computer, a laptop computer, a smart device, a smart phone, a mobile device, a handheld device, a tablet, a monitor device, a portable computing device or another type of computing device. The confirmation component 302 can generate a user interface for presentation on the electronic device 304. The electronic device 304 can also present confirmation data 306 provided by and/or generated by the confirmation component 302. The confirmation data 306 can include, for example, the set of candidate borders, the quality information, the timing information and/or other information associated with the stream of log sequences 118. In an aspect, a user can confirm the set of candidate borders and/or the set of transactions sequences via the electronic device 304. As such, identified transaction borders and/or identified transaction sequences with related statistics can be presented to user for confirmation.

Figure 4:
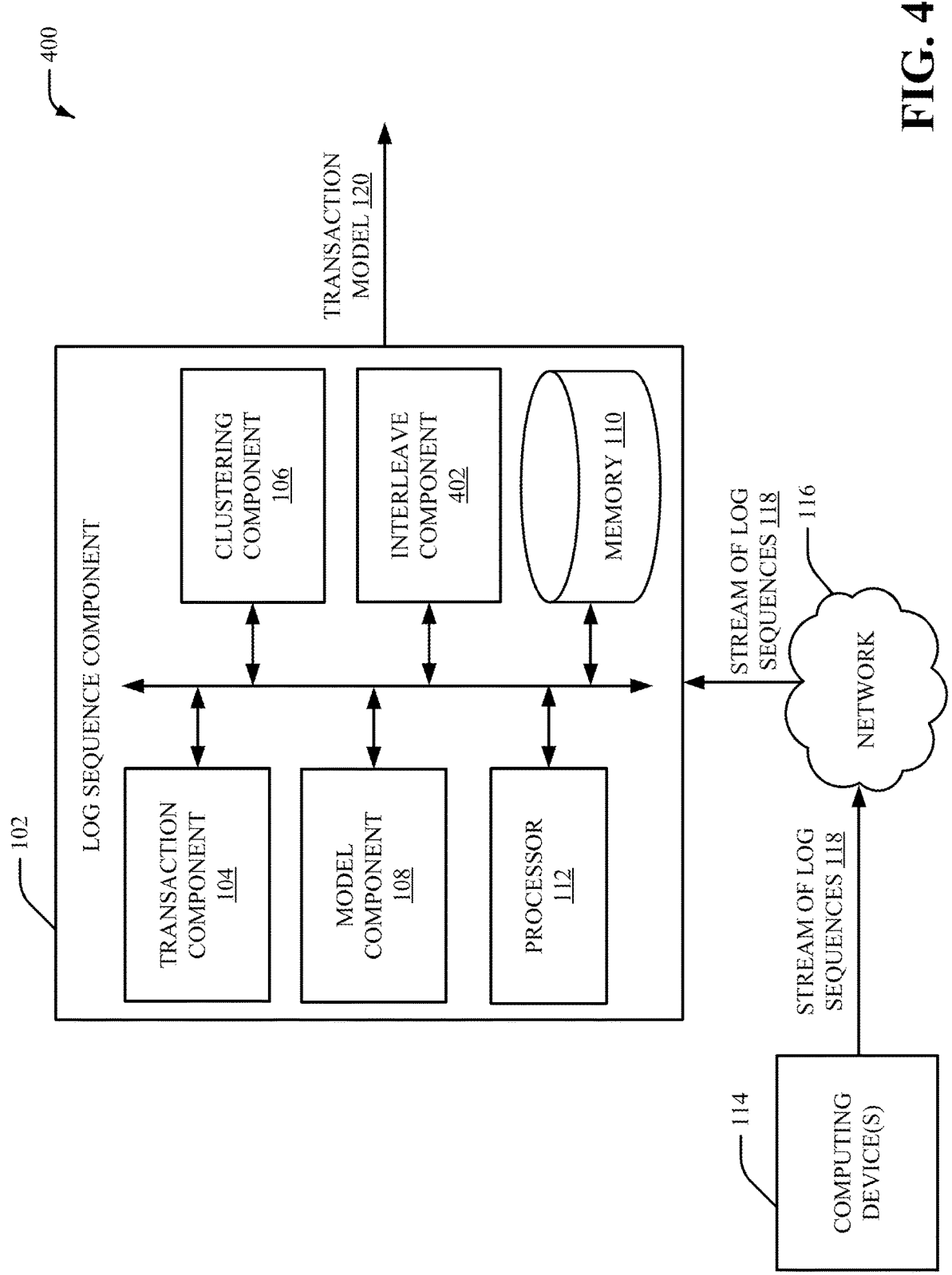
FIG. 4 illustrates a block diagram of yet another example, non-limiting system in accordance with one or more embodiments of the present invention.

FIG. 4 illustrates a block diagram of an example, non-limiting system 400 in accordance with one or more embodiments. Repetitive description of like elements employed in other embodiments described herein is omitted for sake of brevity.

Referring now to FIG. 4, system 400 includes log sequence component 102. The log sequence component 102 can include transaction component 104, clustering component 106, model component 108, interleave component 402, memory 110 and processor 112. In an embodiment, transaction component 104 can include border identification component 202, border splitter component 204 and/or confirmation component 302. Additionally or alternatively, in certain embodiments, system 400 can include electronic device 304. The interleave component 402 can process the stream of log sequences 118. For instance, the log sequence component 102 can receive the stream of log sequences 118 from the one or more computing devices 114 as unprocessed data. The unprocessed data of the stream of log sequences 118 can be indicative of logs (e.g., raw log data) generated by the one or more computing devices 114. In one example, the unprocessed data of the stream of log sequences 118 can be multi-threaded log sequences associated with one or more applications (e.g., web applications) executed by the one or more computing devices 114. The interleave component 402 can convert the unprocessed data associated with the stream of log sequences 118 into de-interleaved log sequences (e.g., the interleave component 402 can convert an unprocessed log sequence into a plurality of streams of log sequences). For instance, the interleave component 402 can divide the stream of log sequences 118 into a plurality of streams of logs sequences generated by different processing threads. A particular stream of log sequences from the plurality of streams of logs sequences can represent execution of different types of transaction. Furthermore, transactions included in a particular stream of log sequences from the plurality of streams of logs sequences can be provided sequentially (e.g., transactions can be printed one by one in a particular stream of log sequences). In an aspect, the interleave component 402 can employ a set of tags (e.g., thread identifiers) to divide the stream of log sequences 118 into the plurality of streams of logs sequences. In another aspect, a particular stream of log sequences from the plurality of streams of logs sequences can be stored in a computing container to compartmentalize the particular stream of log sequences. In yet another aspect, the transaction component 104 can individually analyze and/or process the plurality of streams of logs sequences provided by the interleave component 402.

Figure 5:
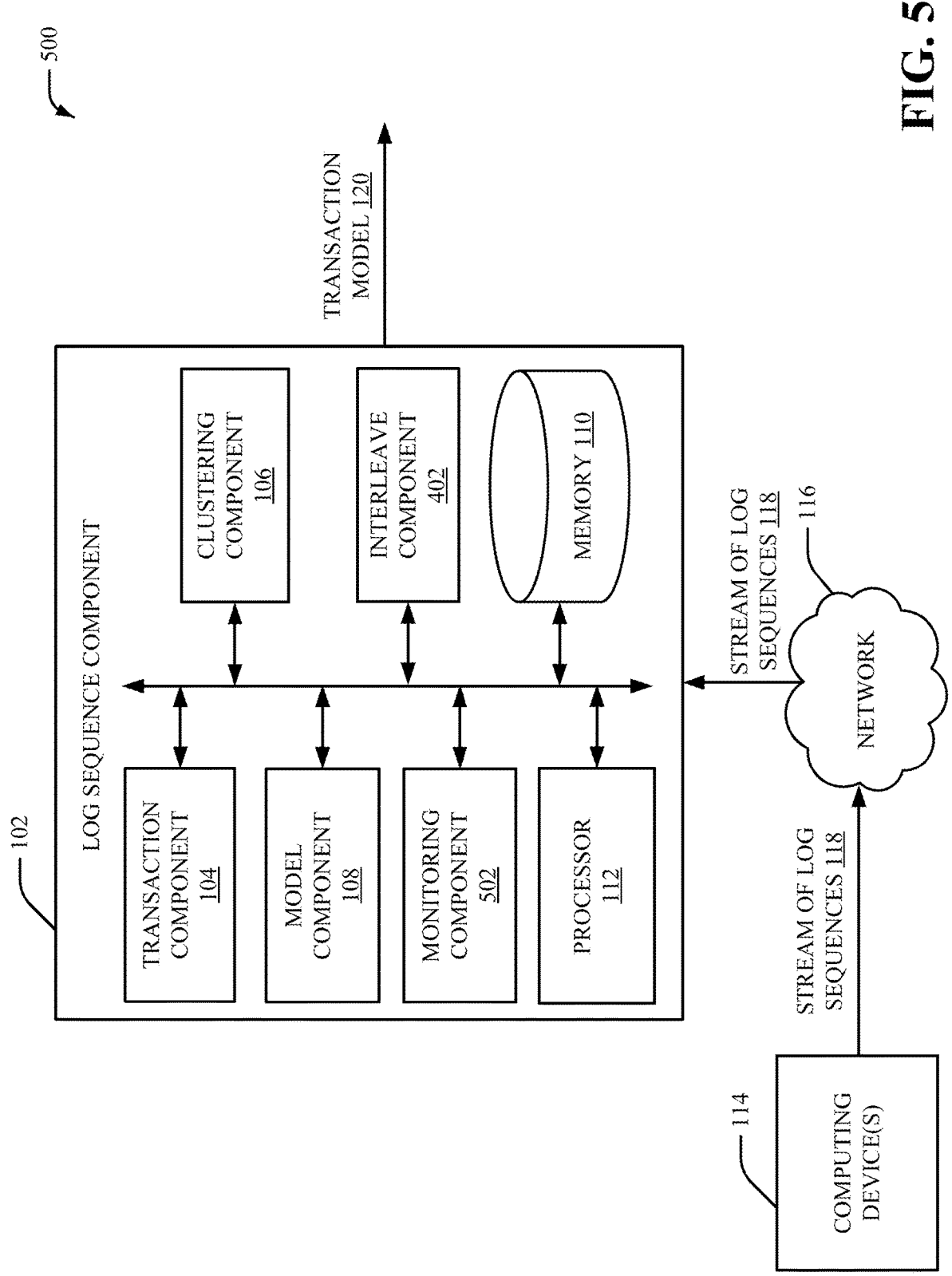
FIG. 5 illustrates a block diagram of yet another example, non-limiting system in accordance with one or more embodiments of the present invention.

FIG. 5 illustrates a block diagram of an example, non-limiting system 500 in accordance with one or more embodiments. Repetitive description of like elements employed in other embodiments described herein is omitted for sake of brevity.

Referring now to FIG. 5, system 500 includes log sequence component 102. The log sequence component 102 can include transaction component 104, clustering component 106, model component 108, interleave component 402, monitoring component 502, memory 110 and processor 112. In an embodiment, transaction component 104 can include border identification component 202, border splitter component 204 and/or confirmation component 302. Additionally or alternatively, in certain embodiments, the system 400 can include electronic device 304. The monitoring component 502 can monitor one or more streams of log sequences generated by the one or more computing devices 114 based on the transaction model 120 generated by the model component 108. For example, the monitoring component 502 can monitor one or more streams of log sequences generated by the one or more computing devices 114 in real-time using the transaction model 120 generated by the model component 108. In an aspect, the monitoring component 502 can determine whether the one or more streams of log sequences generated by the one or more computing devices 114 satisfies a defined criterion based on the transaction model 120 generated by the model component 108. For example, the monitoring component 502 can score the one or more streams of log sequences generated by the one or more computing devices 114 based on quality metrics. In another example, the monitoring component 502 can detect one or more abnormal operations included in the one or more streams of log sequences generated by the one or more computing devices 114. In another aspect, the monitoring component 502 can determine whether the one or more computing devices 114 satisfies a defined criterion based on the transaction model 120 generated by the model component 108. For example, monitoring of the one or more streams of log sequences generated by the one or more computing devices 114 can facilitate detection of an abnormality (e.g., an abnormal operation) associated with the one or more computing devices 114.

Figure 6:
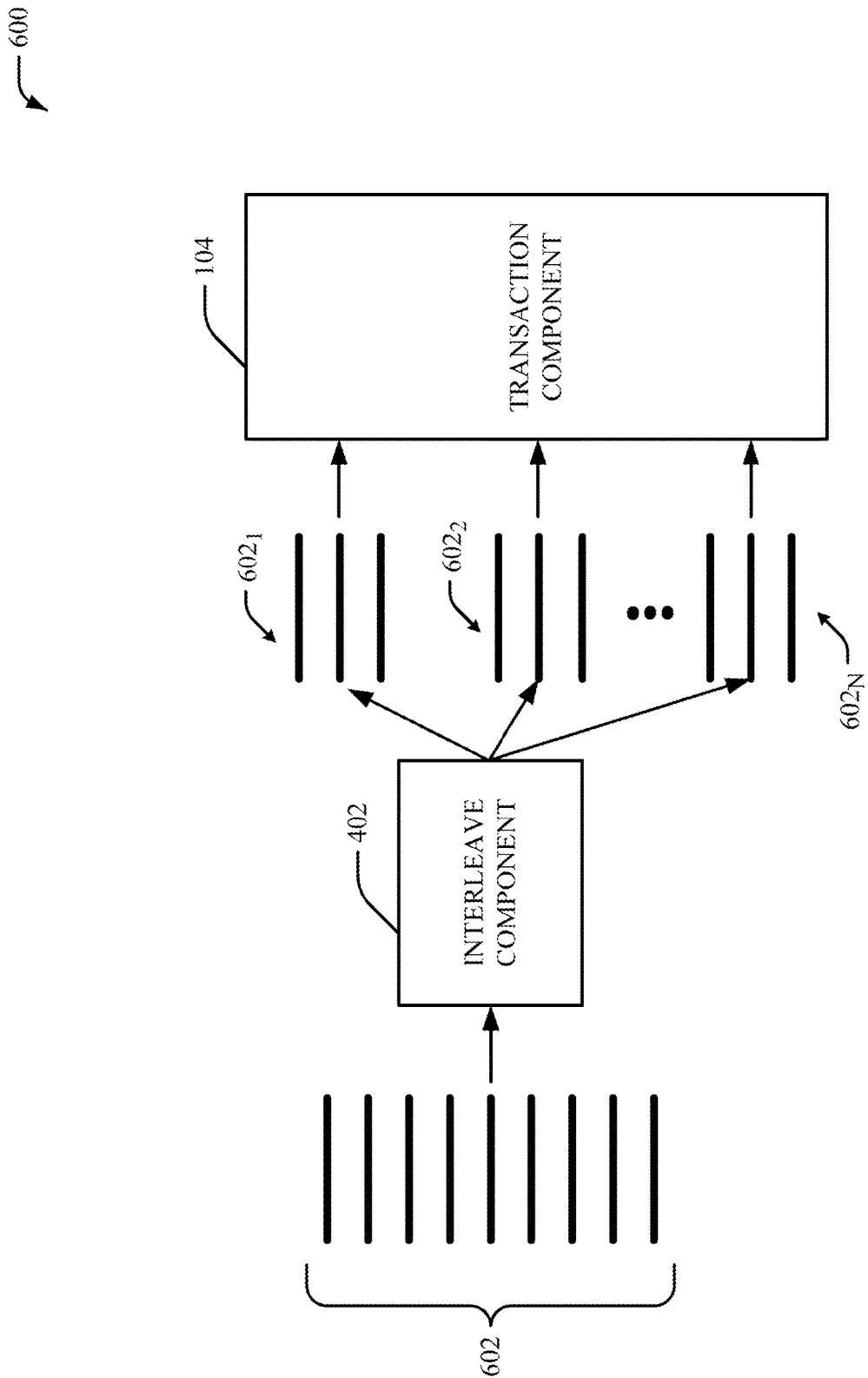
FIG. 6 illustrates an example, non-limiting system associated with an interleave component in accordance with one or more embodiments of the present invention.

FIG. 6 illustrates a block diagram of an example, non-limiting system 600 in accordance with one or more embodiments. Repetitive description of like elements employed in other embodiments described herein is omitted for sake of brevity.

Referring now to FIG. 6, system 600 includes interleave component 304 and transaction component 104. The interleave component 304 can receive a stream of log sequences 602. For example, the stream of log sequences 602 can correspond to the stream of log sequences 118 provided by the one or more computing devices 114 and/or received by the log sequence component 102. Logs included in the stream of log sequences 602 can be interleaved throughout the stream of log sequences 602. Furthermore, in an embodiment, the stream of log sequences 602 can be interleaved into a file. The interleave component 304 can employ a tag such as, for example, a thread identification, to identify threads in the stream of log sequences 602. For example, the interleave component 304 can de-interleave the stream of log sequences 602 into a set of log sequence threads $602_{1-N}$ based on a set of tags (e.g., a set of threads identifiers). As such, the interleave component 304 can compartmentalize the stream of log sequences 602 into the set of log sequence threads $602_{1-N}$. The set of log sequence threads $602_{1-N}$ can be received by the transaction component 104 for further analysis and/or processing by the transaction component 104.

Figure 7:
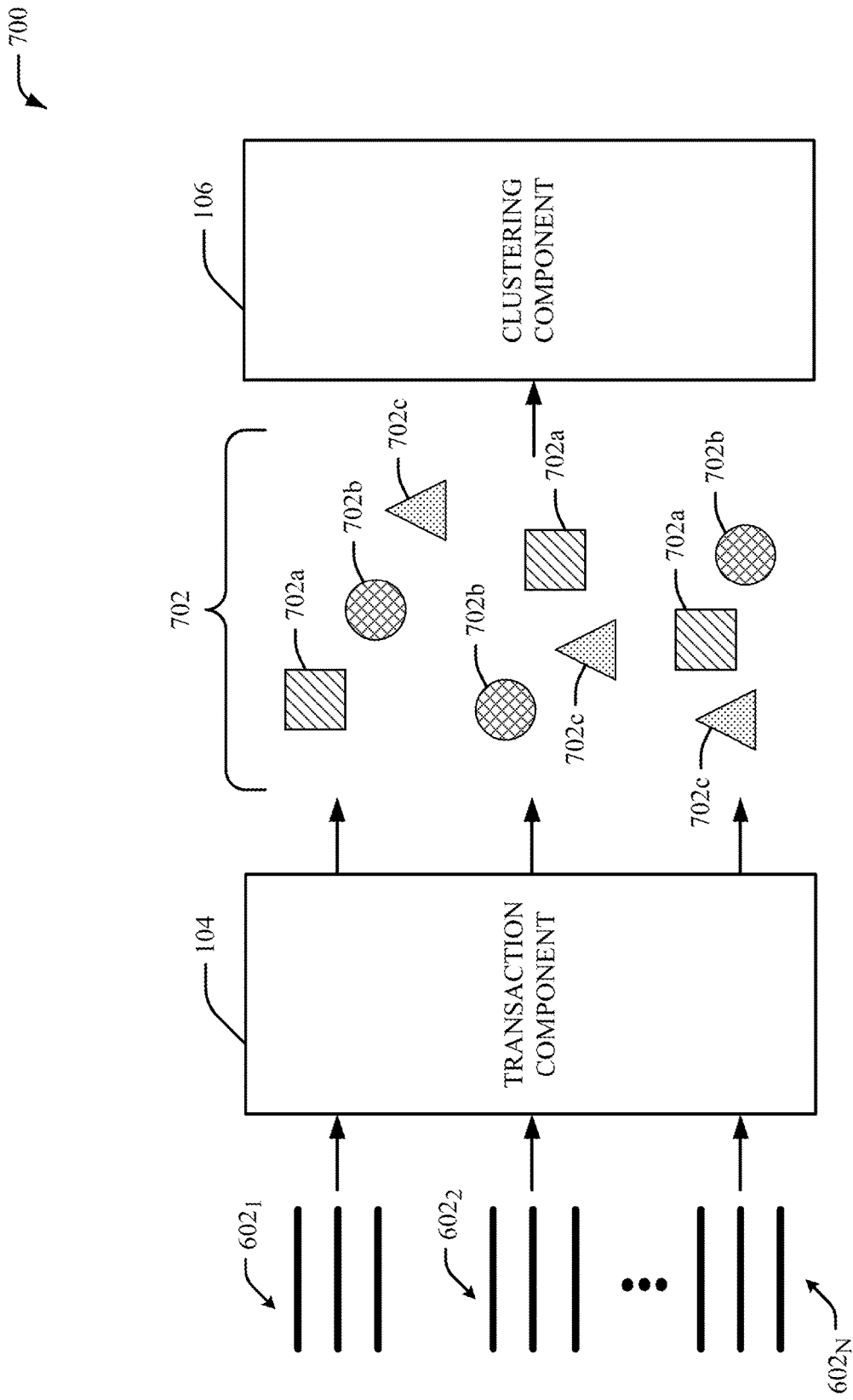
FIG. 7 illustrates an example, non-limiting system associated with a transaction component in accordance with one or more embodiments of the present invention.

FIG. 7 illustrates a block diagram of an example, non-limiting system 700 in accordance with one or more embodiments. Repetitive description of like elements employed in other embodiments described herein is omitted for sake of brevity.

Referring now to FIG. 7, system 700 includes transaction component 104 and clustering component 106. The transaction component 104 can analyze and/or process the set of log sequence threads $602_{1-N}$. For example, the transaction component 104 can determine a start and an end for one or more transactions included in the set of log sequence threads $602_{1-N}$. In an aspect, the transaction component 104 can identify a border between transactions included in the set of log sequence threads $602_{1-N}$. The transaction component 104 can employ one or more data mining techniques to identify a border between transactions included in the set of log sequence threads $602_{1-N}$. For instance, the transaction component 104 can perform one or more machine learning process with respect to the set of log sequence threads $602_{1-N}$ to identify a set of digital signatures associated with the set of log sequence threads $602_{1-N}$. The transaction component 104 can also filter the set of digital signatures based on characteristics associated with the set of digital signatures. Furthermore, the transaction component 104 can divide the set of log sequence threads $602_{1-N}$ into a set of transaction sequences based on the set of digital signatures. In an embodiment, the transaction component 104 can identify a border between transactions included in the set of log sequence threads $602_{1-N}$ based on a data mining process that identifies data signatures that correspond to a digital identifiers for candidate borders. Additionally or alternatively, the transaction component 104 can identify a border between transactions included in the set of log sequence threads $602_{1-N}$ using a filtering criterion associated with characteristics of transaction sequences and/or candidate borders. For instance, the transaction component 104 can perform data mining of log signatures within the set of log sequence threads $602_{1-N}$, the transaction component 104 can perform data mining of invariant sequences within the set of log sequence threads $602_{1-N}$ using local characteristics and/or global characteristics of the set of log sequence threads $602_{1-N}$, filter candidate border based on the local characteristics and/or global characteristics of the set of log sequence threads $602_{1-N}$, select candidate borders based on timing information associated with transaction sequences in the set of log sequence threads $602_{1-N}$, select candidate borders based distribution patterns associated with transaction sequences in the set of log sequence threads $602_{1-N}$, select candidate borders average values of the candidate borders, determine quality of candidate boarders, etc. Based on the borders, the transaction component 104 can identify transaction sequences 702. For example, the transaction component 104 can identify a first type of transaction sequence 702a, a second type of transaction sequence 702b, a third type of transaction sequence 702c, etc. within the set of log sequence threads $602_{1-N}$. However, the transaction sequences 702 identified by the transaction component 104 can be unstructured. For instance, after borders are identified in the set of log sequence threads $602_{1-N}$, in the set of log sequence threads $602_{1-N}$ can be split into various unstructured transaction sequences. Therefore, the transaction sequences 702 can be provided to the clustering component 106 for further analysis and/or processing by the clustering component 106.

Figure 8:
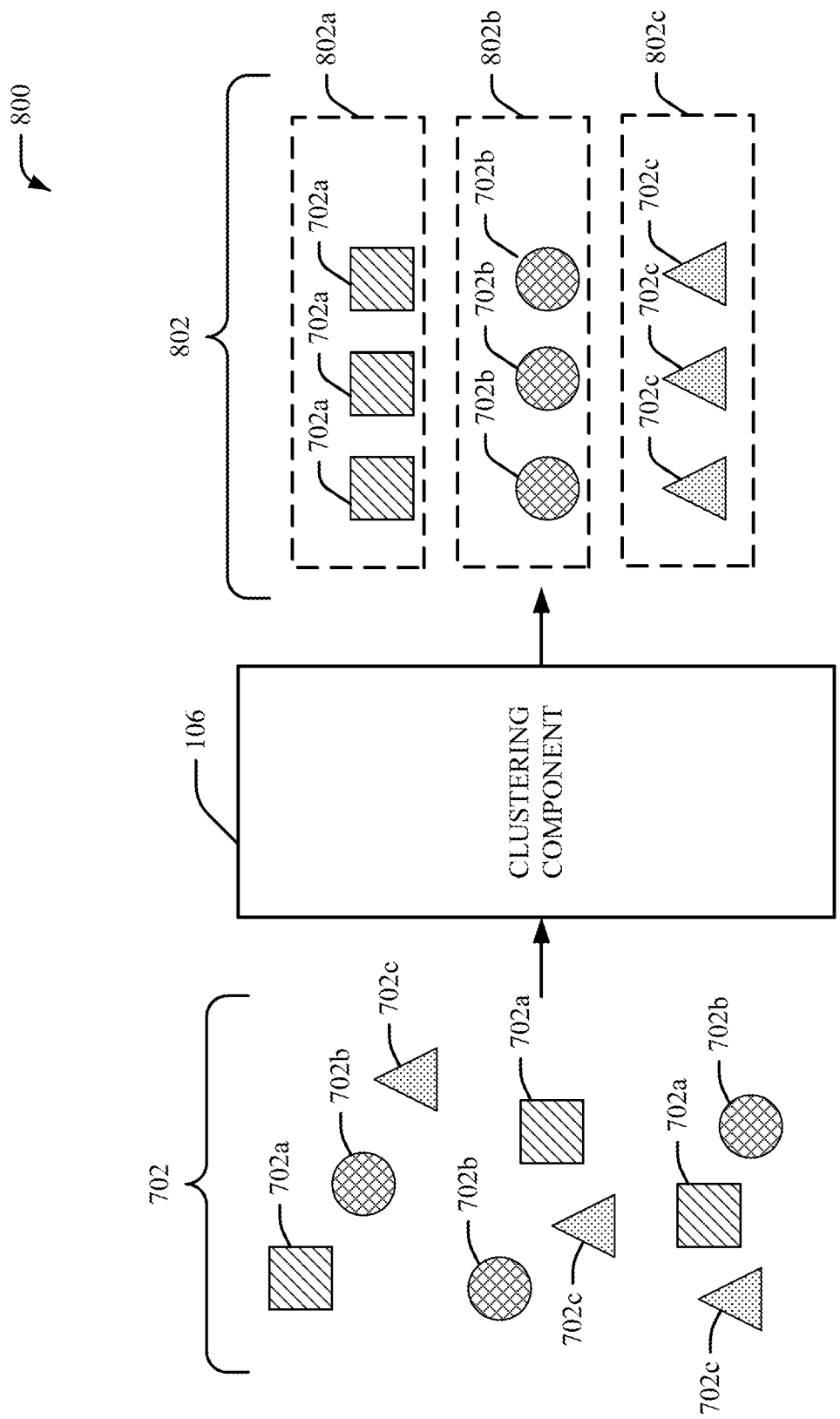
FIG. 8 illustrates an example, non-limiting system associated with a clustering component in accordance with one or more embodiments of the present invention.

FIG. 8 illustrates a block diagram of an example, non-limiting system 800 in accordance with one or more embodiments. Repetitive description of like elements employed in other embodiments described herein is omitted for sake of brevity.

Referring now to FIG. 8, system 800 includes clustering component 106. The clustering component 106 can analyze and/or process the transaction sequences 702 to facilitate generation of a structured version 802 of the transaction sequences. For example, the clustering component 106 can create a first group of transaction sequences 802a that corresponds to the first type of transaction sequence 702a, a second group of transaction sequences 802b that corresponds to the second type of transaction sequence 702b, a third group of transaction sequences 802c that corresponds to the third type of transaction sequence 702c, etc. As such, the first group of transaction sequences 802a, the second group of transaction sequences 802b and the third group of transaction sequences 802c can be associated with different types of transaction sequences. The structured version 802 of the transaction sequences can be provided to the model component 108 for further analysis and/or processing by the model component 108.

Figure 9:
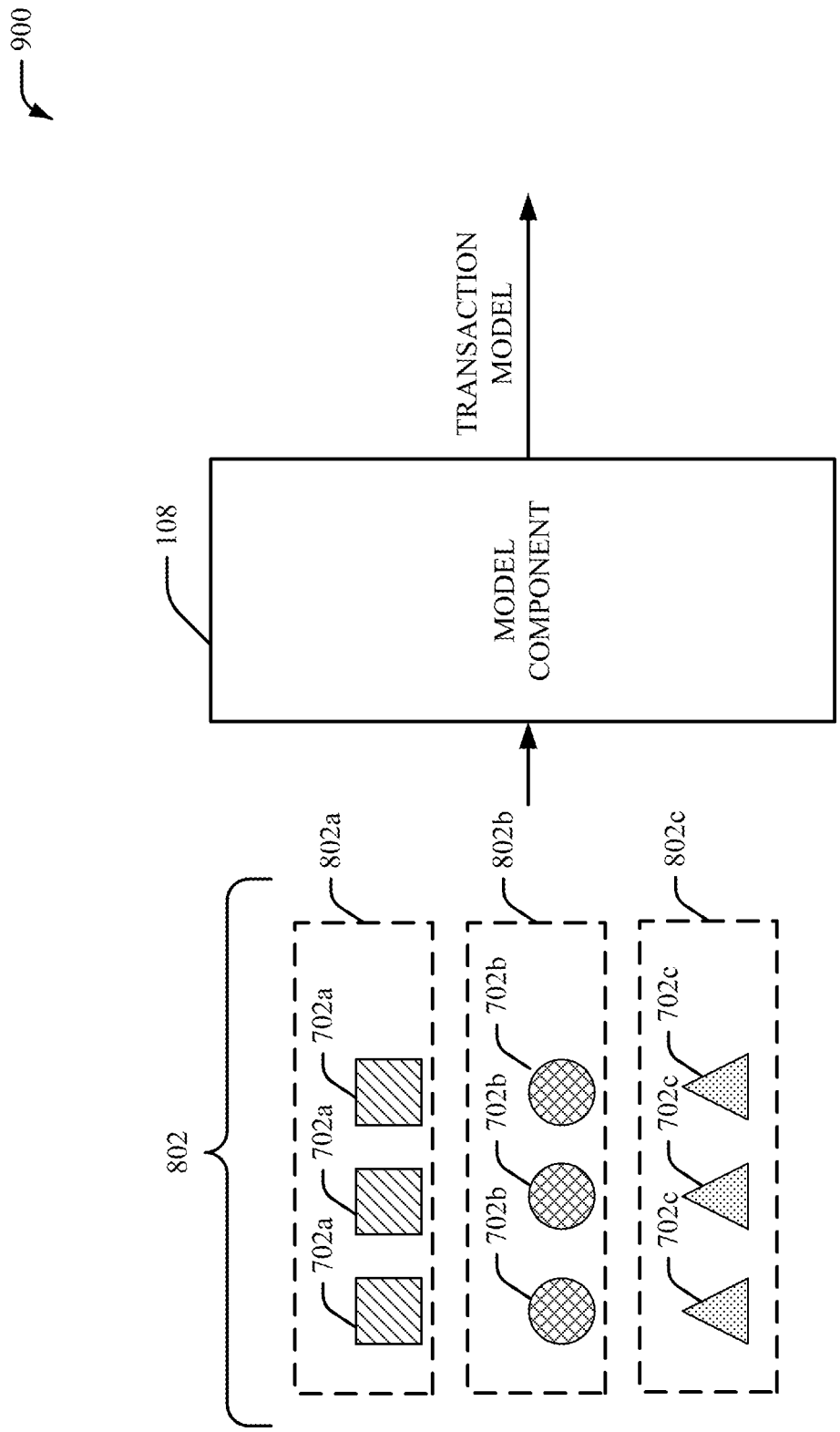
FIG. 9 illustrates an example, non-limiting system associated with a model component in accordance with one or more embodiments of the present invention.

FIG. 9 illustrates a block diagram of an example, non-limiting system 900 in accordance with one or more embodiments. Repetitive description of like elements employed in other embodiments described herein is omitted for sake of brevity.

Referring now to FIG. 9, system 900 includes model component 108. The model component can analyze and/or process the structured version 802 of the transaction sequences. For example, the model component 108 can generate the transaction model 120 based on the first group of transaction sequences 802a, the second group of transaction sequences 802b and/or the third group of transaction sequences 802c. In an embodiment, the model component 108 can generate a first transaction model for the first group of transaction sequences 802a, a second transaction model for the second group of transaction sequences 802b and/or a third transaction model for the third group of transaction sequences 802c.

Figure 10:
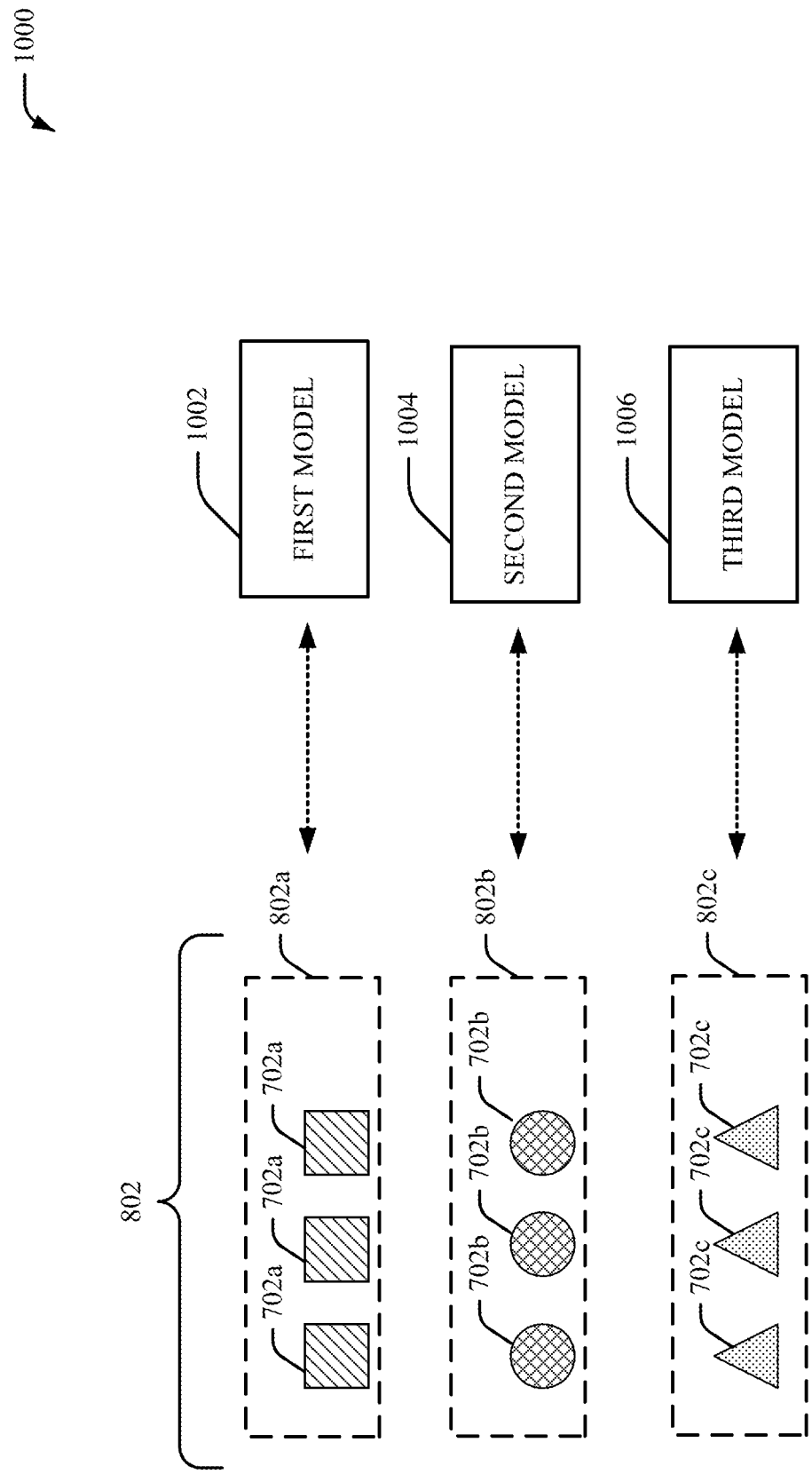
FIG. 10 illustrates another example, non-limiting system associated with a model component in accordance with one or more embodiments of the present invention.

FIG. 10 illustrates a block diagram of an example, non-limiting system 1000 in accordance with one or more embodiments. Repetitive description of like elements employed in other embodiments described herein is omitted for sake of brevity.

Referring now to FIG. 10, system 1000 includes a first model 1002, a second model 1004 and a third model 1006. In an embodiment, the model component 108 can compare the first group of transaction sequences 802a to the first model 1002, compare the second group of transaction sequences 802b to the second model 1004, and/or compare the third group of transaction sequences 802c to the third model 1006. For example, the first model 1002 can be a pre-trained model associated with the first type of transaction sequence 702a, the second model 1004 can be a pre-trained model associated with the second type of transaction sequence 702b, and the third model 1006 can be a pre-trained model associated with the third type of transaction sequence 702c. As such, the model component 108 can score the first group of transaction sequences 802a based on the first model 1002, the second group of transaction sequences 802b based on the second model 1004, and/or the third group of transaction sequences 802c based on the third model 1006.

In another embodiment, the model component 108 can generate the first model 1002 based on the first group of transaction sequences, generate the second model 1004 based on the second group of transaction sequences, and/or generate the third model 1006 based on the third group of transaction sequences. For example, the first model 1002, the second model 1004 and/or the third model 1006 can be employed by the monitoring component 502 to monitor one or more streams of log sequences generated by the one or more computing devices 114, determine whether the one or more streams of log sequences generated by the one or more computing devices 114 satisfies a defined criterion based on the transaction model 120 generated by the model component 108, score the one or more streams of log sequences generated by the one or more computing devices 114 based on quality metrics, detect one or more abnormal operations included in the one or more streams of log sequences generated by the one or more computing devices 114, determine whether the one or more computing devices 114 satisfies a defined criterion based on the transaction model 120 generated by the model component 108, detect an abnormality (e.g., an abnormal operation) associated with the one or more computing devices 114, etc.

Figure 11:
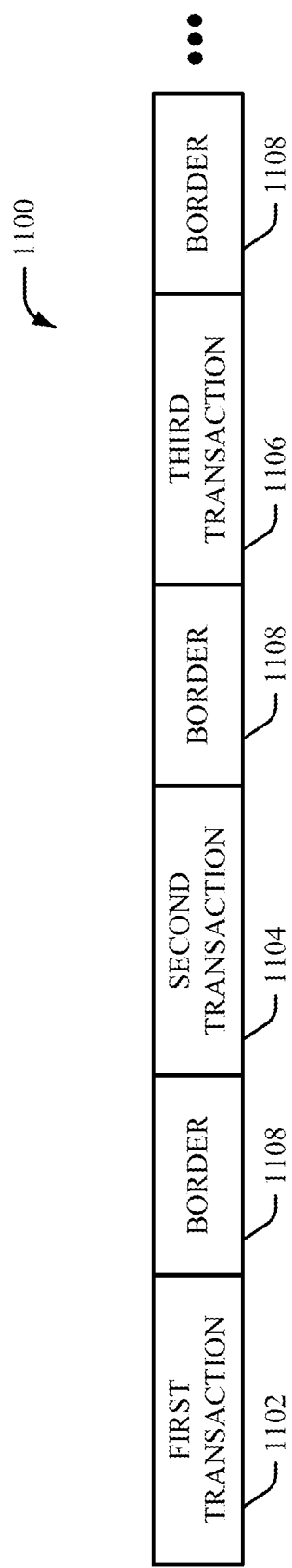
FIG. 11 illustrates an example, non-limiting stream of log sequences in accordance with one or more embodiments of the present invention.

FIG. 11 illustrates an example, non-limiting stream of log sequence threads 1100 in accordance with one or more embodiments. Repetitive description of like elements employed in other embodiments described herein is omitted for sake of brevity.

The stream of log sequence threads 1100 can correspond to, for example, a log sequence thread from the set of log sequence threads $602_{1-N}$. The stream of log sequence threads 1100 can also correspond to a portion of a stream of log sequences processed and/or analyzed by the transaction component 104. The stream of log sequence threads 1100 can be machine data that is multi-threaded with a set of transactions. For example, the stream of log sequence threads 1100 can include a first transaction 1102, a second transaction 1104 and a third transaction 1106. The stream of log sequence threads 1100 can also include a border 1108 before and/or after the first transaction 1102, the second transaction 1104 and the third transaction 1106. The first transaction 1102, the second transaction 1104 and the third transaction 1106 can be a log sequence that represents execution of a transaction performed by the one or more computing devices 114. For example, the first transaction 1102 can be a first log sequence that represents execution of a first type of transaction performed by the one or more computing devices 114, the second transaction 1104 can be a second log sequence that represents execution of a second type of transaction performed by the one or more computing devices 114, and the third transaction 1106 can be a third log sequence that represents execution of a third type of transaction performed by the one or more computing devices 114. The border 1108 can correspond to a digital pattern associated with the first transaction 1102, the second transaction 1104 and/or the third transaction 1106. For instance, the border 1108 can be a heading log entry and/or a tailing log entry of the first transaction 1102, the second transaction 1104 and/or the third transaction 1106. The heading log entry and/or the tailing log entry can be a defined sequence of bits. In a non-limiting example, a border 1108 between the first transaction 1102 and the second transaction 1104 can include a tailing log entry for the first transaction 1102 and a heading log entry for the second transaction 1104. In an embodiment, the transaction component 104 can identify at least one border 1108 in the stream of log sequence threads 1100. For example, the transaction component 104 can employ a data mining process, data signatures and/or one or more filtering techniques as more fully disclosed herein to identify at least one border 1108 in the stream of log sequence threads 1100.

Figure 12:
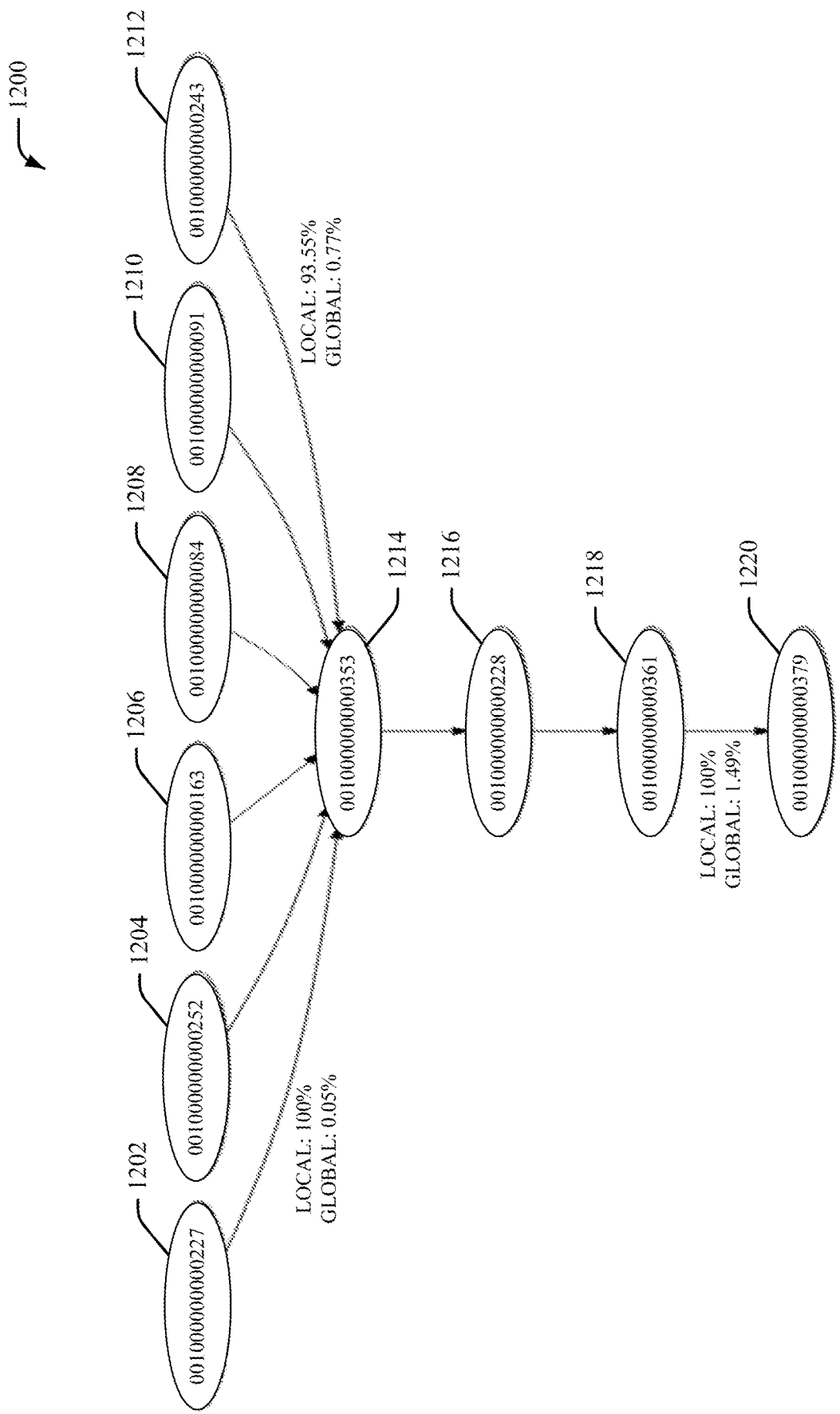
FIG. 12 illustrates an example, non-limiting log sequence graph to facilitate identifying and/or analyzing log sequences in accordance with one or more embodiments of the present invention.

FIG. 12 illustrates an example, non-limiting graph 1200 in accordance with one or more embodiments. Repetitive description of like elements employed in other embodiments described herein is omitted for sake of brevity.

The graph 1200 can be at least a portion of a graph generated by the transaction component 104. For example, the graph 1200 can represent transitions of digital signatures (e.g., log signatures). Furthermore, local support characteristics and global support characteristics can be calculated. The graph 1200 can include a first digital signature 1202, a second digital signature 1204, a third digital signature 1206, a fourth digital signature 1208, a fifth digital signature 1210, a sixth digital signature 1212, a seventh digital signature 1214, an eighth digital signature 1216, a ninth digital signature 1218, and a tenth digital signature 1220. In an aspect, the first digital signature 1202, the second digital signature 1204, the third digital signature 1206, the fourth digital signature 1208, the fifth digital signature 1210 and the sixth digital signature 1212 can be a portion of a transaction sequence that transitions to the seventh digital signature 1214. For example, the first digital signature 1202 can be equal to "001000000000227" and can transition to the seventh digital signature 1214 equal to "001000000000353." Furthermore, a transition from the first digital signature 1202 to the seventh digital signature 1214 can be associated with local characteristics (e.g., a local support) equal to 100% and global characteristics (e.g., a global support) equal to 0.05%. As such, for transitions included in a stream of log sequences that start with "341," 100% of the transitions can end with "453." Moreover, for all transitions in a stream of log sequences that start with any combination of digital values, 0.05% of the transitions can occur as a pair between a beginning portion equal to "341" and an ending portion equal to "453." In another example, the sixth digital signature 1212 can be equal to "001000000000243" and can transition to the seventh digital signature 1214 equal to "001000000000353." Furthermore, a transition from the sixth digital signature 1212 to the seventh digital signature 1214 can be associated with local characteristics (e.g., a local support) equal to 93.55% and global characteristics (e.g., a global support) equal to 0.77%.

As such, for transitions included in a stream of log sequences that start with "243," 93.55% of the transitions can end with "453". Moreover, for all transitions in a stream of log sequences that start with any combination of digital values, 0.77% of the transitions can occur as a pair between a beginning portion equal to "243" and an ending portion equal to "453".

In another aspect, the seventh digital signature 1214 can be a portion of a transaction sequence that transitions to the eighth digital signature 1216, the eighth digital signature 1216 can be a portion of a transaction sequence that transitions to the ninth digital signature 1218, and the ninth digital signature 1218 can be a portion of a transaction sequence that transitions to the tenth digital signature 1220. In an example, the ninth digital signature 1218 can be equal to "001000000000361" and can transition to the tenth digital signature 1220 equal to "001000000000379". Furthermore, a transition from the ninth digital signature 1218 to the tenth digital signature 1220 can be associated with local characteristics (e.g., a local support) equal to 100% and global characteristics (e.g., a global support) equal to 1.49%. As such, for transitions included in a stream of log sequences that start with "361", 100% of the transitions can end with "379." Moreover, for all transitions in a stream of log sequences that start with any combination of digital values, 1.49% of the transitions can occur as a pair between a beginning portion equal to "361" and an ending portion equal to "379." In an embodiment, the transaction component 104 can employ the graph 1200, local characteristics and/or global characteristics to filter a set of digital signatures. In a non-limiting example, the ninth digital signature 1218 can be removed from the set of digital signatures since the global characteristic associated with the ninth digital signature 1218 is greater than 1%. However, it is to be appreciated that a set of digital signatures can be filtered based on other criteria and/or threshold levels associated with the graph 1200, local characteristics and/or global characteristics.

Figure 13:
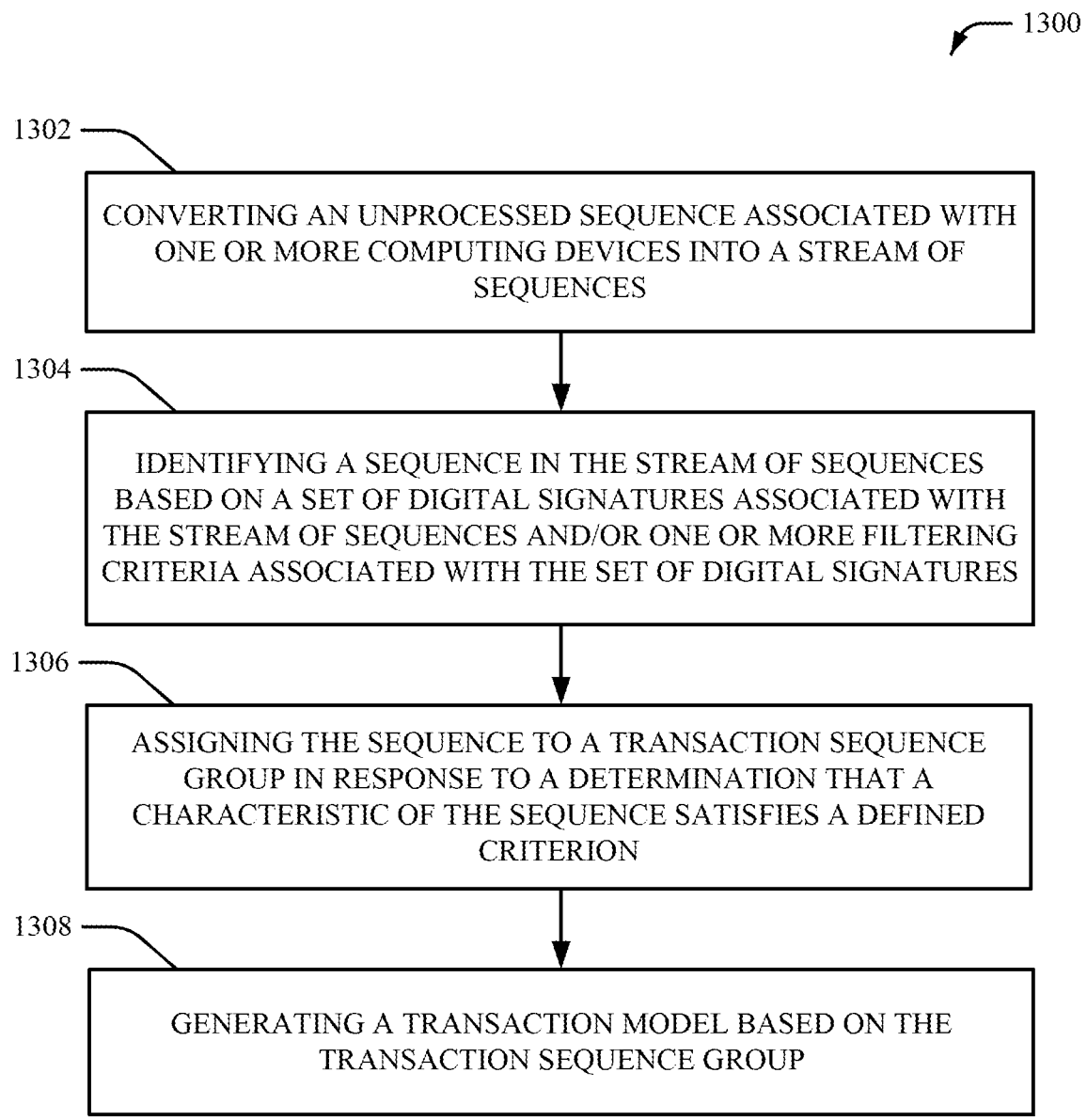
FIG. 13 illustrates a flow diagram of an example, non-limiting computer-implemented method for identifying and/or analyzing sequences in accordance with one or more embodiments of the present invention.

FIG. 13 illustrates a flow diagram of an example, non-limiting computer-implemented method 1300 for identifying and/or analyzing sequences in accordance with one or more embodiments. At 1302, an unprocessed sequence associated with one or more computing devices is converted into a stream of sequences (e.g., by interleave component 402). For example, an unprocessed log sequence associated with one or more computing devices can be converted into a stream of log sequences. At 1304, a sequence in the stream of sequences is identified based on a set of digital signatures associated with the stream of sequences and/or one or more filtering criteria associated with the set of digital signatures. For example, a transaction sequence in the stream of log sequences can be identified based on a set of digital signatures associated with the stream of log sequences and/or one or more filtering criteria associated with the set of digital signatures. At 1306, the sequence is assigned to a transaction sequence group (e.g., by clustering component 106) in response to a determination that a characteristic of the sequence satisfies a defined criterion. For example, the transaction sequence can be assigned to a group of transaction sequences in response to a determination that a characteristic of the transaction sequence satisfies a defined criterion. At 1308, a transaction model is generated (e.g., by model component 108) based on the transaction sequence group. For example, a transaction model can be generated based on the group of transaction sequences.

Figure 14:
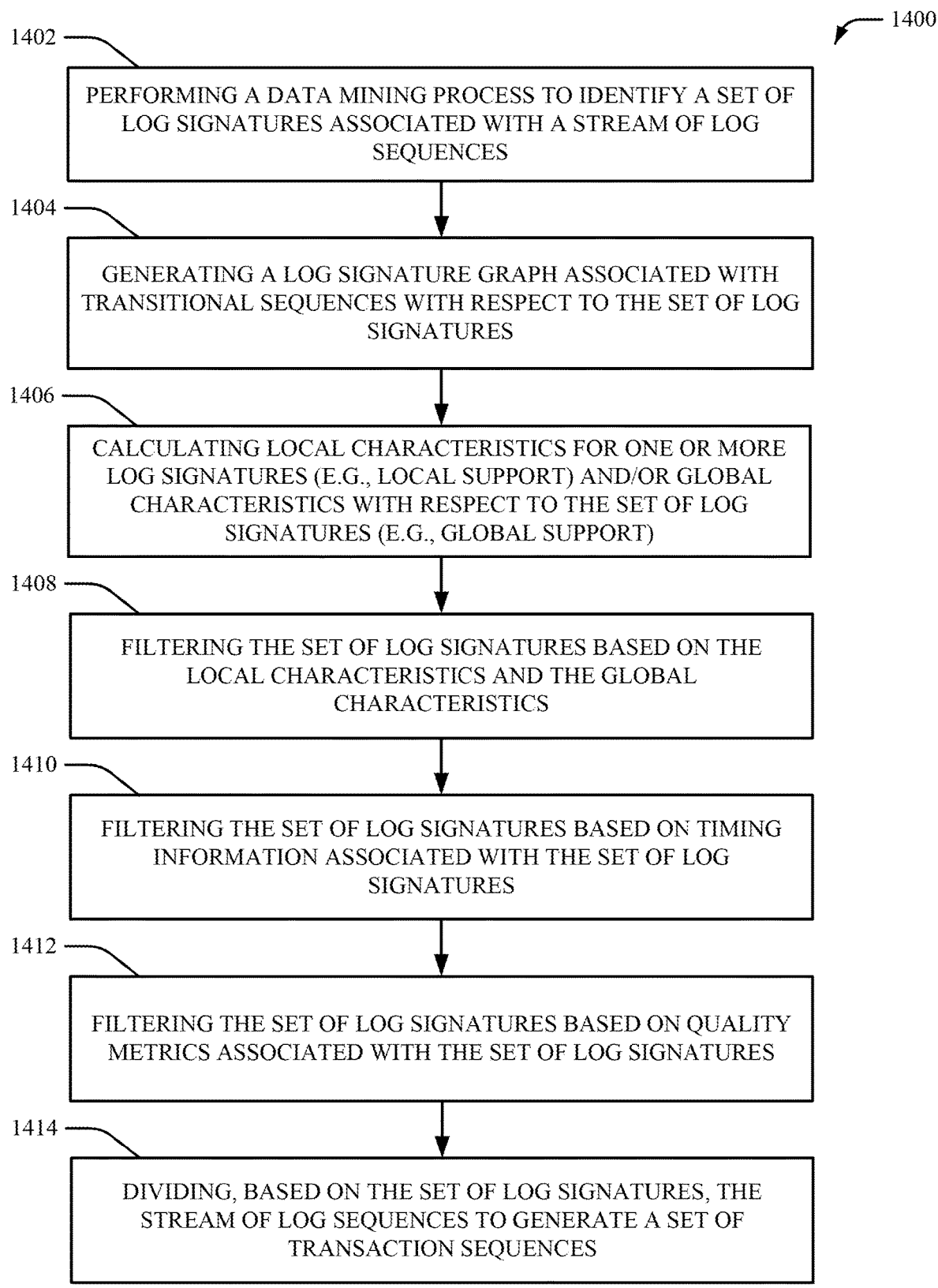
FIG. 14 illustrates a flow diagram of another example, non-limiting computer-implemented method for identifying and/or analyzing log sequences in accordance with one or more embodiments of the present invention.

FIG. 14 illustrates a flow diagram of an example, non-limiting computer-implemented method 1400 for identifying and/or analyzing log sequences in accordance with one or more embodiments. At 1402, a data mining process is performed (e.g., by transaction component 104) to identify a set of log signatures associated with a stream of log sequences. At 1404, a log signature graph associated with transitional sequences with respect to the set of log signatures is generated (e.g., by transaction component 104). At 1406, local characteristics for one or more log signatures (e.g., local support) and/or global characteristics with respect to the set of log signatures (e.g., global support) are calculated (e.g., by transaction component 104). At 1408, the set of log signatures is filtered (e.g., by transaction component 104) based on the local characteristics and the global characteristics. At 1410, the set of log signatures is filtered (e.g., by transaction component 104) based on timing information associated with the set of log signatures. At 1412, the set of log signatures is filtered (e.g., by transaction component 104) based on quality metrics associated with the set of log signatures. At 1414, the stream of log sequences divided (e.g., by transaction component 104) based on the set of log signatures to generate a set of transaction sequences.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least identifying and/or analyzing log sequences are established from a combination of electrical and mechanical components and circuitry, a human is unable to replicate or perform processing and/or analysis performed by the log sequence component 102 (e.g., the transaction component 104, the clustering component 106, the model component 108, the interleave component 402, the monitoring component 502, the border identification component 202, the border splitter component 204 and/or the confirmation component 302) disclosed herein. For example, a human is unable to communicate data and/or packetized data associated with identifying and/or analyzing log sequences by the log sequence component 102 (e.g., the transaction component 104, the clustering component 106, the model component 108, the interleave component 402, the monitoring component 502, the border identification component 202, the border splitter component 204 and/or the confirmation component 302).

Figure 15:
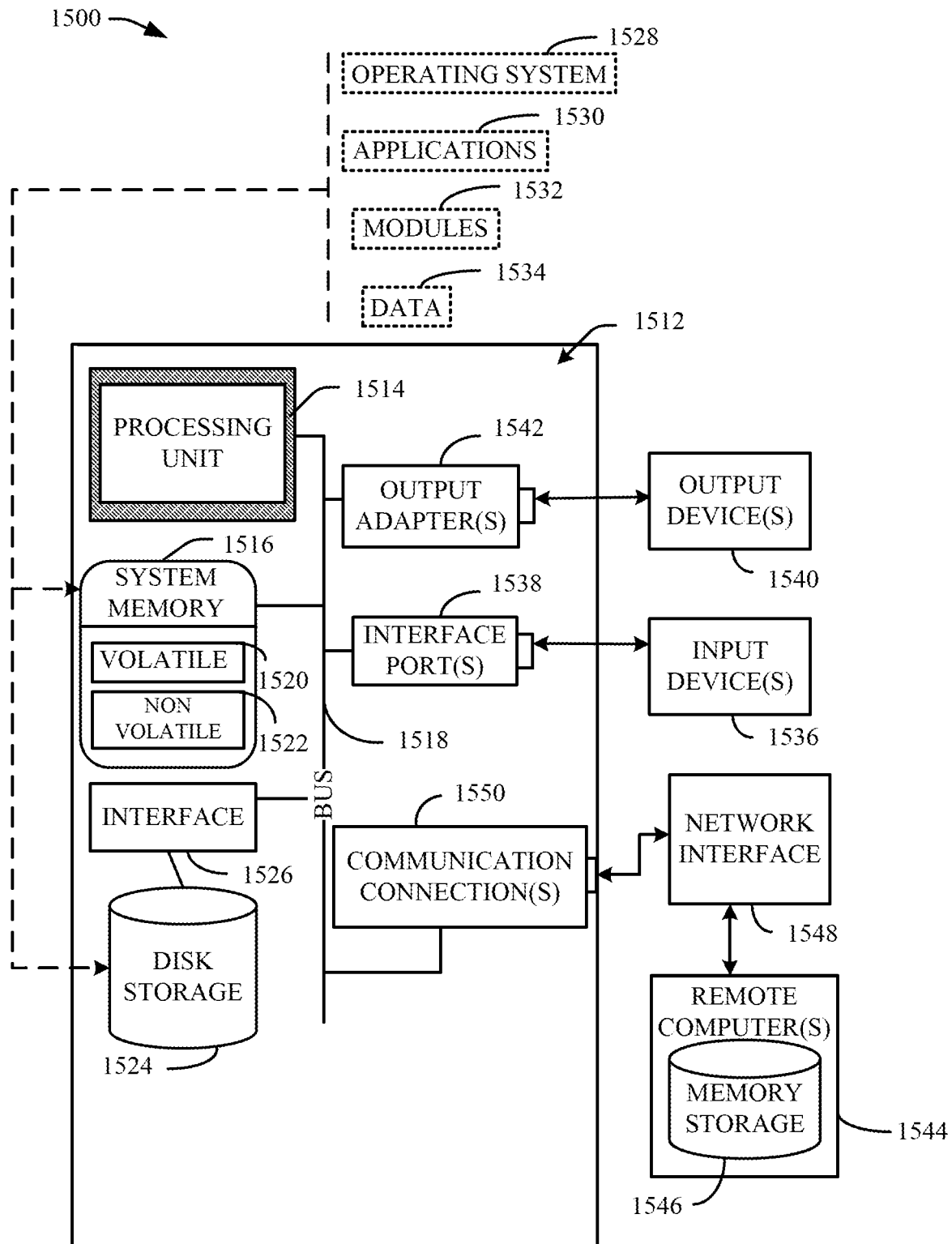
FIG. 15 illustrates a block diagram of an example, non-limiting operating environment in accordance with one or more embodiments of the present invention.

In order to provide a context for various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in accordance with one or more embodiments. Repetitive description of like elements employed in other embodiments described herein is omitted for sake of brevity.

With reference to FIG. 15, a suitable operating environment 1500 for implementing various aspects of this disclosure can include a computer 1512. The computer 1512 can also include a processing unit 1514, a system memory 1516, and a system bus 1518. The system bus 1518 operably couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. In an embodiment, the program modules 1532 and/or the program data 1534 can be associated with the log sequence component 102. In another embodiment, the program modules 1532 and/or the program data 1534 can be associated with software associated with a transaction model (e.g., the program modules 1532 and/or the program data 1534 can be associated with transaction model software provided as a service in a cloud environment associated with a transaction model generated by the log sequence component 102). A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

Figure 16:
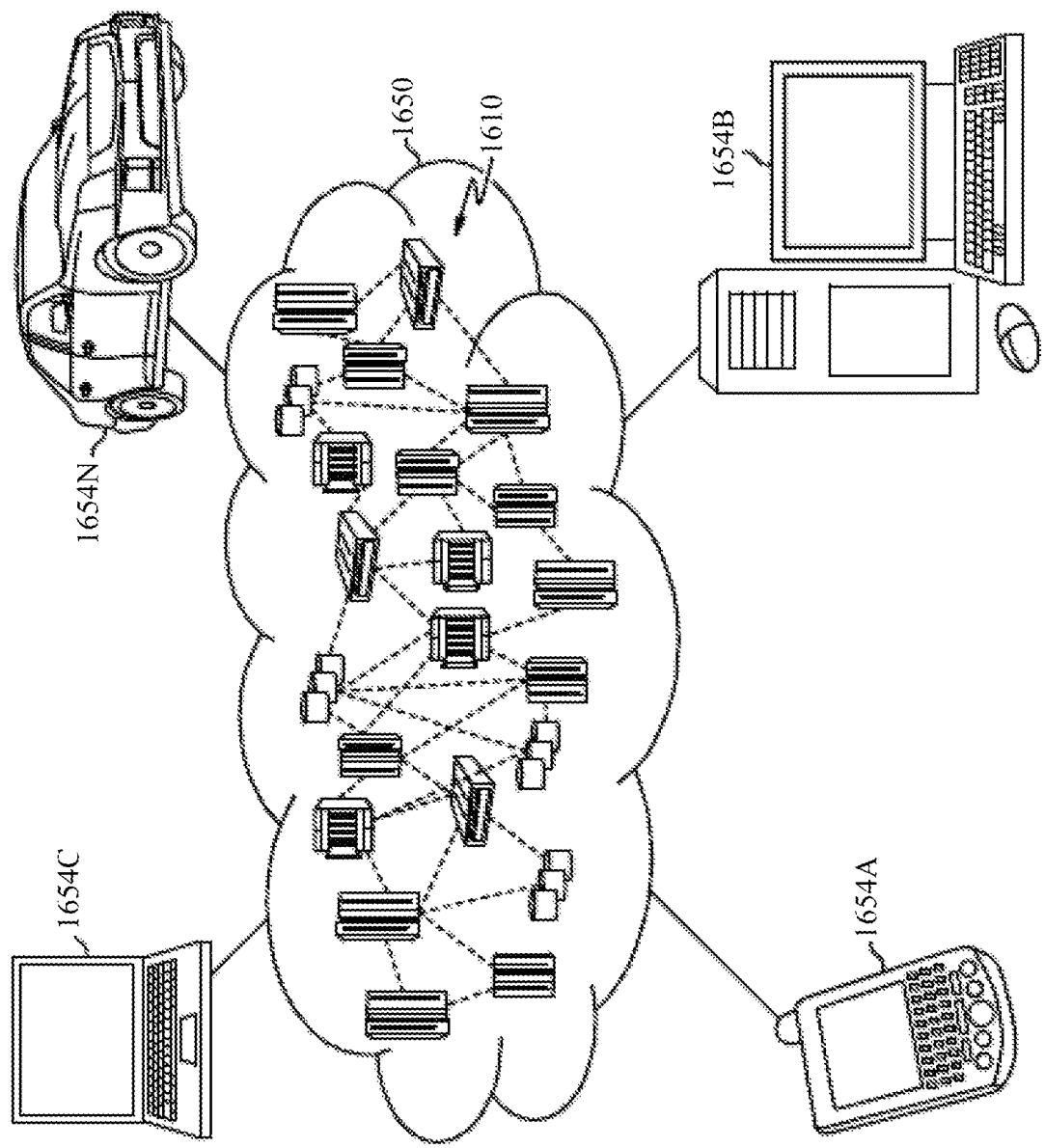
FIG. 16 illustrates a block diagram of an example, non-limiting cloud computing environment in accordance with one or more embodiments of the present invention.

Referring now to FIG. 16, an illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
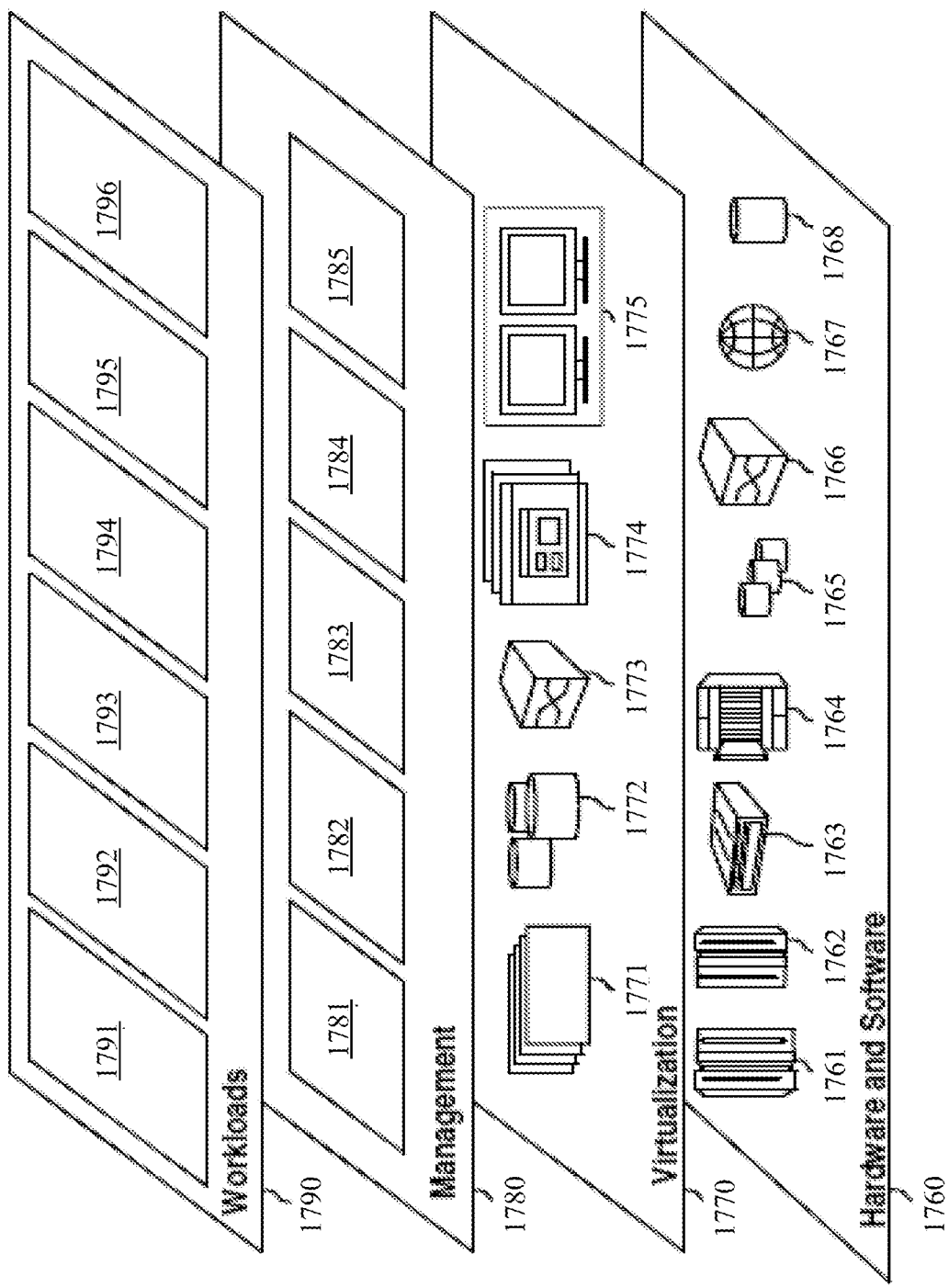
FIG. 17 illustrates a block diagram of example, non-limiting abstraction model layers in accordance with one or more embodiments of the present invention.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767 and database software 1768.

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and Pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of, cloud computing resources for which a future requirement is anticipated in accordance with an SLA.

Workloads layer 1790 provides examples of functionality for which the cloud computing environment may be utilized. Non-limiting examples of workloads and functions which may be provided from this layer include: mapping and navigation 1791; software development and lifecycle management 1792; virtual classroom education delivery 1793; data analytics processing 1794; transaction processing 1795; and transaction model software 1796.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components;
   a processor operably coupled to the memory and that executes computer executable components stored in the memory, wherein the computer executable components comprise:
   a transaction component that identifies sequences of transactions in a stream of logged data generated by a computing device in communication with the system, wherein the transaction component identifies a sequence of transactions of the sequences of transactions based on a determination that a characteristic of the transactions in the sequence satisfies a first defined criterion and that a quantity of transactions in the sequence satisfies a second defined criterion, wherein the transaction component comprises:
   a border identification component that identifies one or more candidate borders between neighboring transactions in a stream of the sequences of transactions based on performing data mining, wherein the data mining comprises identifying and analyzing digital patterns in the sequences of transactions based on detecting sequential patterns in the sequences of transactions; and
   a confirmation component that presents the one or more candidate borders determined by the border identification component on an electronic device distinct from the system;
   a clustering component that assigns the sequences to transaction sequence groups; and
   a model component that generates a transaction model based on the transaction sequence group.

2. The system of claim 1, wherein the sequence of the sequences is indicative of an operation executed by the computing device, wherein the transaction component identifies the operation based on the sequence, and wherein the transaction component further comprises:
   a border splitter component that removes a transaction sequence from the sequences of transactions based on a determination that a transition period with regard to a second transaction sequence is above a defined threshold level.

3. The system of claim 1, wherein the transaction component identifies the sequence of the sequences based on the characteristic comprising a digital signature associated with a portion of the stream of logged data and the first defined criterion comprising a filtering criterion associated with the stream of logged data.

4. The system of claim 1, wherein the transaction component identifies the sequence of the sequences based on a quality metric associated with transactions in the sequence, wherein the quality metric is indicative of a degree to which a transaction of the transactions in the sequence is contained within the one or more candidate borders identified by the border identification component.

5. The system of claim 1, wherein the clustering component assigns a sequence of the sequences to the transaction sequence group based on the length of the sequence or a total number of digital signatures associated with the sequence.

6. The system of claim 1, wherein the clustering component assigns a sequence of the sequences to the transaction sequence group based on an interval of time associated with an execution of the sequence via the computing device.

7. The system of claim 1, wherein software is provided as a service in a cloud environment associated with the transaction model.

8. The system of claim 1, wherein the model component determines an abnormality associated with the computing device based on the transaction model, and wherein the transaction model facilitates a decrease in abnormalities associated with the computing device.

9. The system of claim 1, wherein the computer executable components further comprise:
an interleave component that generates the stream of logged data based on unprocessed data received from the computing device.

10. The system of claim 1, wherein the transaction component identifies the sequence of the sequences as a transaction sequence or a log sequence in the stream of logged data generated by the computing device.

11. A computer-implemented method, comprising:
identifying, by a system operatively coupled to a processor, a sequence of transactions in a stream of logged data associated with a computing device based on a determination that a characteristic of the transactions in the sequence satisfies a first defined criterion and that a quantity of transactions in the sequence satisfies a second defined criterion;
identifying, by the system, one or more candidate borders between neighboring transactions in a stream of the sequences of transactions based on performing data mining, wherein the data mining comprises identifying and analyzing digital patterns in the sequences of transactions based on detecting sequential patterns in the sequences of transactions;
presenting, by the system, the one or more candidate borders determined by the border identification component on an electronic device distinct from the system;
assigning, by the system, the sequence to a transaction sequence group;
generating, by the system, a transaction model based on the transaction sequence group.

12. The computer-implemented method of claim 11, wherein the identifying comprises identifying the sequence based on the characteristic comprising timing information associated with a set of digital signatures associated with the stream of logged data.

13. The computer-implemented method of claim 11, wherein the identifying comprises identifying the sequence based on the characteristic comprising quality data associated with a set of digital signatures associated with the stream of logged data.

14. The computer-implemented method of claim 11, wherein the assigning comprises assigning the sequence to the transaction sequence group based on the length of the sequence.

15. The computer-implemented method of claim 11, wherein the assigning comprises assigning the sequence to the transaction sequence group based on a time period associated with an execution of the sequence by the computing device.

16. The computer-implemented method of claim 11, further comprising:
determining, by the system, whether the computing device satisfies a third defined criterion based on the transaction model.

17. The computer-implemented method of claim 11, further comprising:
identifying, by the system, an abnormality associated with the computing device based on the transaction model to facilitate improved performance of the computing device.

18. A computer program product for identifying a transaction sequence, the computer program product comprising a computer readable storage medium having program instructions embodied therewith, the program instructions executable by a processor to cause the processor to:
identify sequences of transactions in a stream of logged data associated with a computing device, wherein the identifying comprises identifying a sequence of transactions of the sequences of transactions based on a determination that a characteristic of the transactions in the sequence satisfies a first defined criterion and that a quantity of transactions in the sequence satisfies a second defined criterion;
identify one or more candidate borders between neighboring transactions in a stream of the sequences of transactions based on performing data mining, wherein the data mining comprises identifying and analyzing digital patterns in the sequences of transactions based on detecting sequential patterns in the sequences of transactions;
presenting the one or more candidate borders determined by the border identification component on an electronic device distinct from the system;
assigning the sequences to transaction sequence groups; and
generating a transaction model based on the transaction sequence groups.

19. The computer program product of claim 18, wherein the program instructions are further executable by the processor to cause the processor to:
form, based on the sequences, at least a first transaction sequence group for a first transaction model and a second transaction sequence group for a second transaction model.

20. The computer program product of claim 18, wherein the program instructions are further executable by the processor to cause the processor to:
compare the transaction sequence group to another transaction model.

* * * * *